United States Patent
Zhang et al.

(10) Patent No.: US 8,751,154 B2
(45) Date of Patent: Jun. 10, 2014

(54) ENHANCED CLEAR PATH DETECTION IN THE PRESENCE OF TRAFFIC INFRASTRUCTURE INDICATOR

(75) Inventors: Wende Zhang, Shelby Township, MI (US); Sanjeev M. Naik, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 715 days.

(21) Appl. No.: 12/581,849

(22) Filed: Oct. 19, 2009

(65) Prior Publication Data

US 2010/0100268 A1  Apr. 22, 2010

Related U.S. Application Data

(63) Continuation-in-part of application No. 12/581,659, filed on Oct. 19, 2009, which is a continuation-in-part of application No. 12/474,594, filed on May 29, 2009, which is a continuation-in-part of application No. 12/108,581, filed on Apr. 24, 2008.

(60) Provisional application No. 61/215,745, filed on May 8, 2009.

(51) Int. Cl.
| | |
|---|---|
| G01C 22/00 | (2006.01) |
| G05D 1/00 | (2006.01) |
| G06F 19/00 | (2011.01) |
| G06G 7/70 | (2006.01) |
| G06G 7/76 | (2006.01) |
| G08G 1/00 | (2006.01) |
| H04N 7/00 | (2011.01) |
| H04N 7/18 | (2006.01) |

(52) U.S. Cl.
USPC ............... 701/411; 701/26; 701/28; 701/117; 348/119

(58) Field of Classification Search
USPC ............ 701/23–28, 117–122, 408–430, 701/431–433, 437–450, 461–467, 300–302, 701/533; 340/988–996; 348/E7.085, 348/113–119
See application file for complete search history.

(56) References Cited

U.S. PATENT DOCUMENTS

| | | | |
|---|---|---|---|
| 5,844,505 A * | 12/1998 | Van Ryzin | 340/988 |
| 6,018,697 A * | 1/2000 | Morimoto et al. | 701/411 |

(Continued)

FOREIGN PATENT DOCUMENTS

| | | |
|---|---|---|
| CN | 1577319 A | 2/2005 |
| DE | 10334620 A1 | 2/2005 |

(Continued)

OTHER PUBLICATIONS

Lucente (Lucente et al, "UMD Raptor", University of Michigan-Dearborn, Department of Electrical and Computer Engineering, Jun. 10-12, 2006).*

(Continued)

*Primary Examiner* — Khoi Tran
*Assistant Examiner* — Abby Lin

(57) ABSTRACT

A method for detecting a clear path of travel for a vehicle utilizing analysis of a plurality of images generated by a camera device located upon the vehicle includes monitoring the images. The images are analyzed including determining a clear path upon which a potential road surface can be estimated from other portions of the images that do not indicate a potential road surface, and determining an image of a traffic infrastructure indication. The method further includes determining the content of the traffic infrastructure indication, modifying the clear path based upon the content of the traffic infrastructure indication, and utilizing the modified clear path in navigation of the vehicle.

14 Claims, 13 Drawing Sheets

(56) References Cited

U.S. PATENT DOCUMENTS

| | | | |
|---|---|---|---|
| 6,032,098 A * | 2/2000 | Takahashi et al. | 701/23 |
| 6,058,339 A * | 5/2000 | Takiguchi et al. | 701/28 |
| 6,405,132 B1 * | 6/2002 | Breed et al. | 701/301 |
| 6,560,529 B1 * | 5/2003 | Janssen | 701/469 |
| 6,968,266 B2 * | 11/2005 | Ahmed-Zaid et al. | 701/96 |
| 7,202,776 B2 * | 4/2007 | Breed | 340/435 |
| 7,376,262 B2 | 5/2008 | Hu | |
| 7,440,585 B2 | 10/2008 | Roh | |
| 7,566,851 B2 * | 7/2009 | Stein et al. | 250/205 |
| 2006/0009188 A1 * | 1/2006 | Kubota et al. | 455/344 |
| 2006/0213714 A1 | 9/2006 | Igawa | |
| 2007/0050134 A1 * | 3/2007 | Hayashida et al. | 701/209 |
| 2007/0152804 A1 * | 7/2007 | Breed et al. | 340/435 |
| 2007/0225907 A1 * | 9/2007 | Oonishi et al. | 701/209 |
| 2008/0162027 A1 * | 7/2008 | Murphy et al. | 701/117 |
| 2009/0074249 A1 * | 3/2009 | Moed et al. | 382/104 |
| 2009/0268946 A1 | 10/2009 | Zhang et al. | |
| 2009/0268948 A1 | 10/2009 | Zhang et al. | |
| 2009/0295917 A1 | 12/2009 | Zhang et al. | |
| 2009/0299622 A1 * | 12/2009 | Denaro | 701/201 |
| 2010/0017060 A1 | 1/2010 | Zhang et al. | |
| 2010/0097455 A1 | 4/2010 | Zhang et al. | |
| 2010/0097456 A1 | 4/2010 | Zhang et al. | |
| 2010/0097457 A1 | 4/2010 | Zhang et al. | |
| 2010/0097458 A1 | 4/2010 | Zhang et al. | |
| 2010/0098290 A1 | 4/2010 | Zhang et al. | |
| 2010/0098295 A1 | 4/2010 | Zhang et al. | |
| 2010/0098297 A1 | 4/2010 | Zhang | |
| 2010/0103040 A1 * | 4/2010 | Broadbent | 342/357.14 |
| 2010/0104137 A1 | 4/2010 | Zhang et al. | |
| 2010/0104199 A1 | 4/2010 | Zhang et al. | |
| 2010/0121577 A1 | 5/2010 | Zhang et al. | |
| 2010/0253541 A1 * | 10/2010 | Seder et al. | 340/905 |

FOREIGN PATENT DOCUMENTS

| | | |
|---|---|---|
| JP | 2003189291 A | 7/2003 |
| KR | 1020050069060 A | 7/2005 |
| KR | 1020060021388 A | 3/2006 |

OTHER PUBLICATIONS

Lucente et al, "UMD Raptor", University of Michigan-Dearborn, Department of Electrical and Computer Engineering, Jun. 10-12, 2006.*

U.S. Appl. No. 61/215,745, Not Publ'd.

Mallat, S., A Theory for Multi-Resolution Signal Decomposition: The Wavelet Representation, IEEE Transactions on Pattern Analysis and Machine Intelligence, 11, 1989, pp. 674-693.

Haar, A., Zur Theorie der orthogonalen Funktionensysteme, Mathematische Annalen, 69, 1910, pp. 331-371.

Daugman, J.G., Uncertainty Relations for Resolution in Space, Spatial frequency, and Orientation Optimized by Two-Dimensional Visual Cortical Filters, Journal of the Optical Society of America A, vol. 2, 1985, pp. 1160-1169.

Leung, T. and Malik, J., Representing and Recognizing the Visual Appearance of Materials Using Three Dimensional Textons, International Journal of Computer Vision, 43(1), Jun. 2001, pp. 29-44.

Burges, C. J.C., A Tutorial on Support Vector Machines for Pattern Recognition, 1998, pp. 1-43, Kluwer Academic Publishers, Boston.

Lucas, Bruce D., "An Iterative Image Registration Techique with an Application to Stereo Vision," Proceedings of Imaging Understanding Workshop, pp. 121-130 (1981).

Harris, Chris, "A Combined Corner and Edge Detector," 1988.

Lowe, David G., "Distinctive Image Features from Scale-Invariant Keypoints," International Journal of Computer Vision, Jan. 5, 2004.

* cited by examiner

ENHANCED CLEAR PATH DETECTION IN THE PRESENCE OF TRAFFIC INFRASTRUCTURE INDICATOR

CROSS REFERENCE TO RELATED APPLICATIONS

This application is a continuation-in-part of U.S. application Ser. No. 12/581,659 filed on Oct. 19, 2009, which is a continuation-in-part of U.S. application Ser. No. 12/474,594 filed on May 29, 2009, which is a continuation-in-part of U.S. application Ser. No. 12/108,581 filed on Apr. 24, 2008. U.S. application Ser. No. 12/581,659 filed on Oct. 19, 2009 claims the benefit of U.S. Provisional Application 61/215,745 filed on May 8, 2009. U.S. application Ser. No. 12/581,659, U.S. application Ser. No. 12/474,594, U.S. application Ser. No. 12/108,581, and U.S. Provisional Application 61/215,745 are incorporated herein by reference.

TECHNICAL FIELD

This disclosure is related to automated or semi-automated control of a motor vehicle.

BACKGROUND

The statements in this section merely provide background information related to the present disclosure and may not constitute prior art.

Autonomous driving systems and semi-autonomous driving systems utilize inputs regarding the road and other driving conditions to automatically control throttle and steering mechanisms. Accurate estimation and identification of a clear path over which to desirably operate a motor vehicle is critical to successfully replacing the human mind as a control mechanism for vehicle operation.

Road conditions can be complex. Under normal operation of a vehicle, the human operator makes hundreds of observations per minute and adjusts operation of the vehicle on the basis of perceived road conditions. One aspect of perceiving road conditions is the perception of the road in the context of objects in and around the roadway and navigating a clear path through any objects. Replacing human perception with technology preferentially includes some means to accurately perceive objects and continue to effectively navigate around such objects.

Technological means for perceiving an object or road conditions include data from visual cameras, radar imaging, LIDAR, vehicle to vehicle communications, vehicle to infrastructure communications, and use of global positioning data with a digital map. Cameras translate visual images in the form of radiation such as light patterns or infrared signatures into a readable data format. One such data format includes pixelated images, in which a perceived scene is broken down into a series of pixels. Radar imaging utilizes radio waves generated by a transmitter to estimate shapes and objects present in front of the transmitter. Patterns in the waves reflecting off these shapes and objects can be analyzed and the locations of objects can be estimated.

Once data has been generated regarding the ground in front of the vehicle, the data must be analyzed to estimate the presence of objects from the data. By using cameras and radar imaging systems, ground or roadway in front of the vehicle can be analyzed for the presence of objects that might need to be avoided. However, the mere identification of potential objects to be avoided does not complete the analysis. An important component of any autonomous system includes how potential objects identified in perceived ground data are processed and manipulated to identify a clear path in which to operate the vehicle.

One known method to identify a clear path in which to operate the vehicle is to catalog and provisionally identify all perceived objects and identify a clear path in light of the locations and behaviors of identified objects. Images may be processed to identify and classify objects according to their form and relationship to the roadway. While this method can be effective in identifying a clear path, it requires a great deal of processing power, requiring the recognition and separation of different objects in the visual image, for instance, distinguishing between a tree along the side of the road and a pedestrian walking toward the curb. Such methods can be slow or ineffective to process complex situations or may require bulky and expensive equipment to supply the necessary processing capacity.

SUMMARY

A method for detecting a clear path of travel for a vehicle utilizing analysis of a plurality of images generated by a camera device located upon the vehicle includes monitoring the images. The images are analyzed including determining a clear path upon which a potential road surface can be estimated from other portions of the images that do not indicate a potential road surface, and determining an image of a traffic infrastructure indication. The method further includes determining the content of the traffic infrastructure indication, modifying the clear path based upon the content of the traffic infrastructure indication, and utilizing the modified clear path in navigation of the vehicle.

BRIEF DESCRIPTION OF THE DRAWINGS

One or more embodiments will now be described, by way of example, with reference to the accompanying drawings, in which:

FIG. 13A depicts the interest point from the current image and the pixel region surround the interest point;

FIG. 13B depicts the interest point from the previous image and the pixel region surround the interest point;

DETAILED DESCRIPTION

Figure 1:
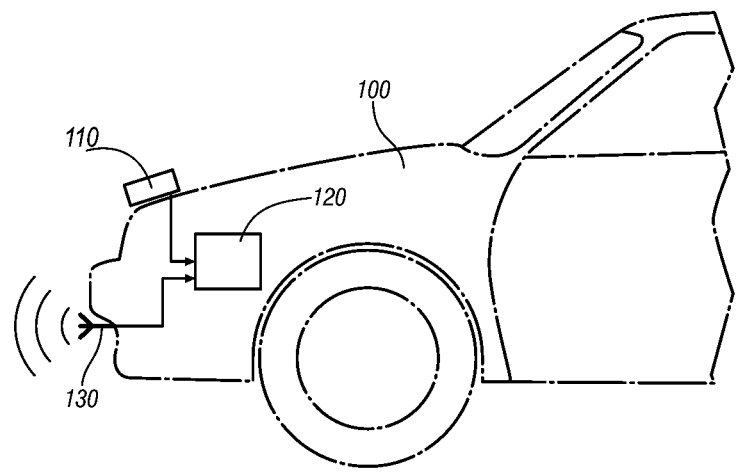
FIG. 1 illustrates an exemplary arrangement of a vehicle equipped with a camera and a radar imaging system in accordance with the disclosure.

Referring now to the drawings, wherein the showings are for the purpose of illustrating certain exemplary embodiments only and not for the purpose of limiting the same, FIG. 1 illustrates an exemplary arrangement of camera 110 located on the front of a vehicle 100 and pointed toward the ground in front of the vehicle 100 in accordance with the disclosure. Camera 110 is in communication with processing module 120 containing logic to process inputs from camera 110. The vehicle 100 may also be equipped with a radar imaging system 130, which, when present, is also in communication with processing module 120. It should be appreciated by those having ordinary skill in the art that the vehicle 100 could utilize a number of methods to identify road conditions in addition or in the alternative to the use of camera 110 and the radar imaging system 130, including GPS information, information from other vehicles in communication with the vehicle 100, historical data concerning the particular roadway, biometric information such as systems reading the visual focus of the driver, a radar imaging system, or other similar systems. The disclosure herein can be applied to various device arrangements and is therefore not limited thereby.

The camera 110 is a device well known in the art capable of translating visual inputs in the form of light, infrared, or other electro-magnetic (EM) radiation into a data format readily capable of analysis, e.g., a digital, pixelated image. In one embodiment, the camera 110 uses a charge coupled device (CCD) sensor to generate images indicating a field-of-view. Preferably, the camera 110 is configured for continuous image generation, e.g., 30 images generated per second. Images generated by the camera 110 may be stored in memory within the camera 110 or transferred to the processing module 120 for storage and/or analysis. Preferably, each image generated by the camera 110 is a two-dimensional image of known pixel dimensions comprising a plurality of identifiable pixels. The plurality of identifiable pixels may be stored and analyzed using an array. Each pixel may be represented in the array as a set of bits or a plurality of sets of bits wherein the bits correspond to a color on a predetermined palette or color map. Each pixel may be expressed as a function of a plurality of color intensity values such as in a red-green-blue (RGB) color model or a cyan-magenta-yellow-key (CMYK) color model. Preferably, each pixel comprises a plurality of sets of bits wherein each set of bits corresponds to a color intensity and a color intensity value e.g., a first set of bits corresponds to a red color intensity value, a second set of bits corresponds to a green color intensity value, and a third set of bits corresponds to blue color intensity value on the RGB color model.

The radar imaging device 130 is a device well known in the art incorporating a transmitter capable of emitting radio waves or other EM radiation, a receiver device capable of sensing the emitted waves reflected back to the receiver from objects in front of the transmitter, and means to transfer the sensed waves into a data format capable of analysis, indicating for example range and angle from the objects off which the waves reflected. Alternatively, the radar imaging device 130 may be replaced or supplemented with a light detection and ranging (LIDAR) system configured to transmit and receive optical energy. The received optical energy may be used to determine object geometric dimensions and/or geometrical proximity to the vehicle 100. It will be noted that radar imaging device 130 is optional and unnecessary to perform many of the methods disclosed herein, wherein processing of visual images is capable of accomplishing clear path detection.

The processing module 120 is illustrated in FIG. 1, and described herein as a discrete element. Such illustration is for ease of description and it should be recognized that the functions performed by this element may be combined in one or more devices, e.g., implemented in software, hardware, and/or application-specific integrated circuitry. The processing module 120 can be a general-purpose digital computer comprising a microprocessor or central processing unit, storage mediums comprising non-volatile memory including read only memory and electrically programmable read only memory, random access memory, a high speed clock, analog to digital and digital to analog circuitry, and input/output circuitry and devices and appropriate signal conditioning and buffer circuitry. In the alternative, processing module 120 can be a digital signal processing (DSP) unit, such as a customized integrated circuit such as a field programmable gate array. The processing module 120 has a set of processing algorithms, comprising resident program instructions and calibrations stored in the non-volatile memory and executed to provide desired functions. The algorithms are preferably executed during preset loop cycles. Algorithms are executed by the central processing unit and are operable to monitor inputs from the aforementioned sensing devices and execute control and diagnostic routines to control operation of the actuators, using preset calibrations. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The processing module 120 executes algorithmic code stored therein to monitor related equipment such as camera 110 and radar imaging system 130 and execute commands or data transfers as indicated by analysis performed within the processing module. Processing module 120 may include algorithms and mechanisms to actuate autonomous driving control by means known in the art and not described herein, or processing module 120 may simply provide information to a separate autonomous driving system. Processing module 120 is adapted to receive input signals from other systems and the operator as necessary depending upon the exact embodiment utilized in conjunction with the control module.

Figure 2:
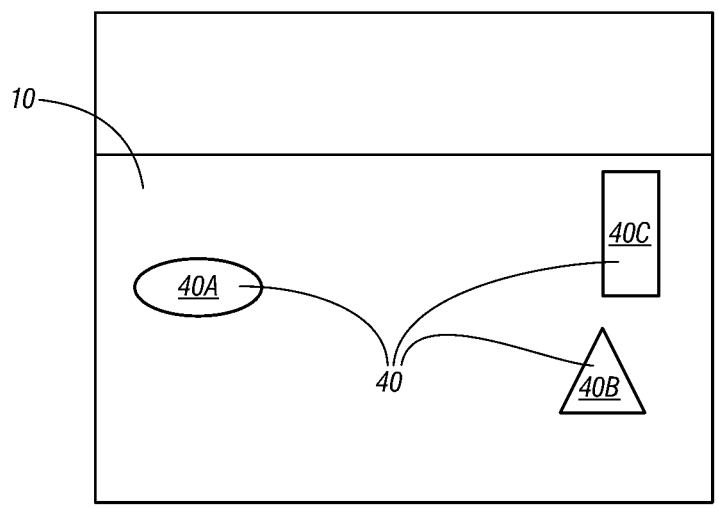
FIG. 2 illustrates a known method to determine a clear path for autonomous driving in accordance with the disclosure.

FIG. 2 illustrates a known method to determine a clear path for autonomous driving in accordance with the disclosure. Image 10 is generated corresponding to the roadway in front of vehicle 100. Through one of various methods, objects 40A, 40B, and 40C are identified within image 10, and each object is categorized and classified according to filtering and trained object behaviors. Separate treatment of each object can be computationally intensive, and requires expensive and bulky equipment to handle the computational load. An algorithm processes all available information regarding the roadway and objects 40 to estimate a clear path available to vehicle 100. Determination of the clear path depends upon the particular classifications and behaviors of the identified objects 40.

Figure 3:
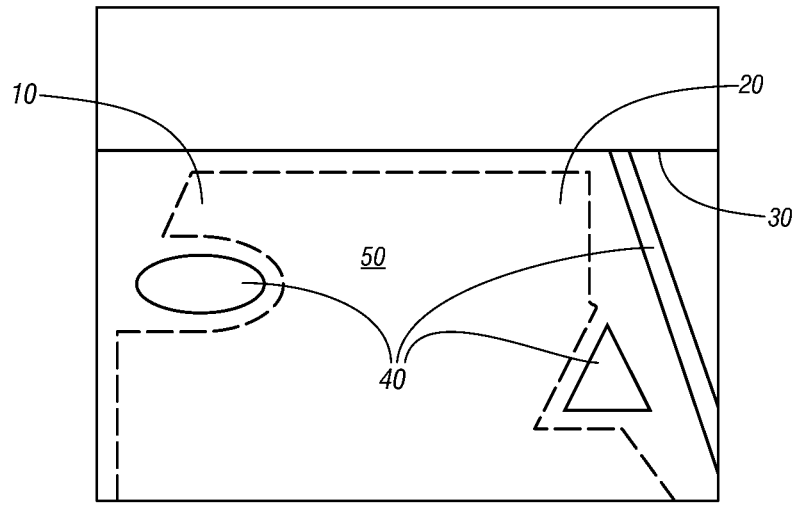
FIG. 3 illustrates an exemplary method to determine a clear path utilizing a likelihood analysis of an image in accordance with the disclosure.

FIG. 3 illustrates an exemplary method to determine a clear path for autonomous or semi-autonomous driving in accordance with the disclosure. Image 10 is depicted including ground 20, horizon 30, and objects 40. Image 10 is collected by camera 110 and represents the road environment in front of vehicle 100. Ground 20 represents the zone of all available paths open to travel without any discrimination on the basis of objects that might be present. The method of FIG. 3 that determines a clear path upon ground 20 starts by presuming all of ground 20 is clear, and then utilizes available data to disqualify portions of ground 20 as not clear. In contrast to the method of FIG. 2 which classifies every object 40, the method of FIG. 3 instead analyzes ground 20 and seeks to define a likelihood from available data that some detectable anomaly which may represent object 40 limits or makes not clear that portion of ground 20. This focus upon ground 20 instead of objects 40 avoids the complex computational tasks associated with managing the detection of the objects. Individual classification and tracking of individual objects is unnecessary, as individual objects 40 are simply grouped together as a part of the overall uniform limitation upon ground 20. Ground 20, described above as all paths open to travel without discrimination, minus limits placed on ground 20 by areas found to be not clear, define clear path 50, depicted in FIG. 3 as the area within the dotted lines, or an area with some threshold likelihood of being open for travel of vehicle 100.

Object 40 that creates not clear limitations upon ground 20 can take many forms. For example, an object 40 can represent a discrete object such as a parked car, a pedestrian, or a road obstacle, or object 40 can also represent a less discreet change to surface patterns indicating an edge to a road, such as a road-side curb, a grass line, or water covering the roadway. Object 40 can also include an absence of flat road associated with ground 20, for instance, as might be detected with a large hole in the road. Object 40 can also include an indicator without any definable change in height from the road, but with distinct clear path implications for that segment of road, such as a paint pattern on the roadway indicative of a lane marker. The method disclosed herein, by not seeking to identify object 40 but merely to take visual cues from ground 20 and anything in proximity to the ground in image 10, evaluates a likelihood of clear versus not clear and adjusts the control of vehicle 100 for the presence of any object 40.

Figure 4:
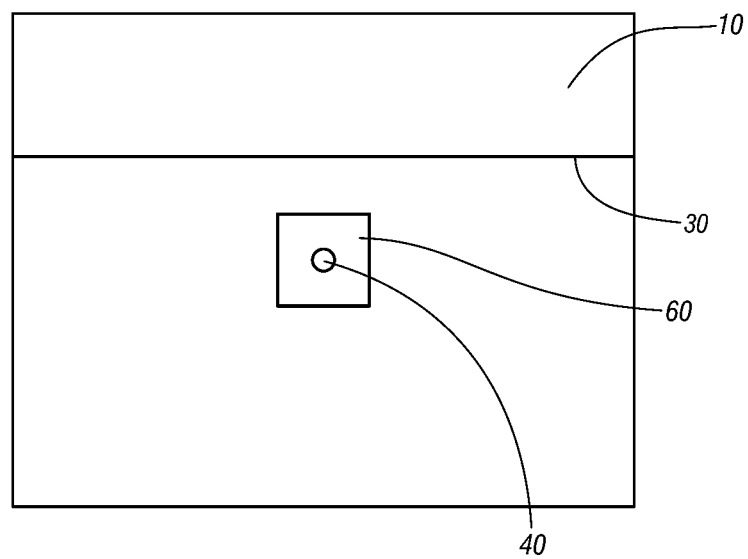
FIG. 4 illustrates an exemplary method to analyze an image in accordance with the disclosure.

Numerous methods for automated analysis of two-dimensional (2D) images are possible. Analysis of image 10 is performed by an algorithm within processing module 120. FIG. 4 illustrates one exemplary method which may be applied to analyze image 10 in accordance with the disclosure. This method subdivides image 10 and identifies a sub-image or patch 60 of ground 20 for analysis, extracts features or analyzes the available visual information from patch 60 to identify any interesting or distinguishing features within the patch, and classifies the patch according to a likelihood of being a clear path according to analysis of the features. Patches with greater than a certain threshold of likeliness are classified as clear, and a compilation of patches can be used to assemble a clear path within the image.

Patch 60, as a sub-image of image 10, can be identified through any known means, such as random search or swarm search of image 10. Alternatively, information regarding the presence of an object 40 available from some other source of information, such as radar imaging system 130, can be used to identify a patch to analyze the portion of image 10 which should describe object 40. Image 10 may require many patches 60 to analyze the whole image. In addition, multiple overlaying patches or patches of different size could be used to fully analyze a region of image 10 containing information of interest. For instance, a small patch 60 might be used to analyze a small dot on the road; however, a large patch 60 might be required to analyze a series of dots which in isolation might seem uninteresting, but in context of the entire series, could indicate an object 40 of interest. In addition, the resolution of patches applied to a particular area may be modulated based upon information available, for instance, with more patches being applied to a region of image 10 wherein an object 40 is thought to exist. Many schemes or strategies can be utilized to define patches 60 for analysis, and the disclosure is not intended to be limited to the specific embodiments described herein.

Once a patch 60 has been identified for analysis, processing module 120 processes the patch by application of a filter to extract features from the patch. Additionally, processing module 120 may perform analysis of the location of the patch in context to the location of the vehicle. Filters utilized may take many forms. Filtering algorithms utilized to extract features often search the available visual information for characteristic patterns in the data, defining features by line orientation, line location, color, corner characteristics, other visual attributes, and learned attributes. Learned attributes may be learned by machine learning algorithms within the vehicle, but are most frequently programmed offline and may be developed experimentally, empirically, predictively, through modeling or other techniques adequate to accurately train distinguishing attributes.

Once features in patch 60 have been extracted, the patch is classified on the basis of the features to determine the likelihood that the patch is a clear path. Likelihood analysis is a process known in the art by which a likelihood value or a confidence is developed that a particular condition exists. Applied to the present disclosure, classification includes likelihood analysis to determine whether the patch represents a clear path or if ground 20 in this patch is limited by an object

40. Classification is performed in an exemplary embodiment by application of classifiers or algorithms trained with a database of exemplary road conditions and interactions with detected objects. These classifiers allow processing module 120 to develop a fractional clear path likelihood value for patch 60, quantifying a confidence between zero and one that the features identified within the patch do not indicate a limiting object 40 which would inhibit free travel of vehicle 100. A threshold confidence can be set, defining the clear path likelihood required to define the patch as a clear path, for instance by the following logic:

$$\text{Confidence}=\text{ClearPathLikelihood}(i) \text{ If\_Confidence}>0.5, \text{then\_patch}=\text{clearpath} \quad (1)$$

In this particular exemplary embodiment, a confidence of 50% or 0.5 is selected as the threshold confidence. This number can be developed experimentally, empirically, predictively, through modeling or other techniques adequate to accurately evaluate patches for clear path characteristics.

Figure 5:
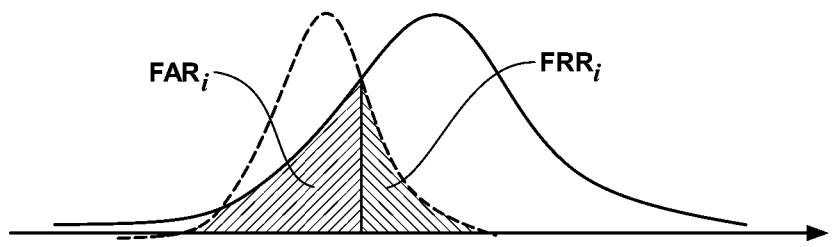
FIG. 5 illustrates an exemplary method to define a classification error by tuning a single threshold in accordance with the disclosure.

The likelihood analysis, as mentioned above, may be performed in one exemplary embodiment by application of trained classifiers to features extracted from a patch. One method analyzes the features a-priori using a training set of images. In this training stage, distinguishing features are selected from a raw feature set, the distinguishing features being defined by methods known in the art, such as Haar wavelet, Gabor wavelet, and Leung-and-Malik filter bank. In addition, 2D image location information based on each feature's minimal classification errors, calculated as the sum of false acceptance rate (FAR) and false rejection rate (FRR), may be utilized by tuning a single threshold as illustrated in FIG. 5. This classification error can be described through the following expression:

$$\text{ClassificationError}(i)=\text{FAR}_i+\text{FRR}_i \quad (2)$$

Information from the trained classifiers is used to classify or weight the feature as indicating a clear path or not clear path, the particular classification depending upon the strength of comparisons to the trained data. Classification of the feature, if the feature is the only feature within the patch, may be directly applied to the patch. Classification of a patch with multiple features identified may take many forms, including the patch being defined by the included feature most indicative of the patch being not clear or the patch being defined by a weighted sum of all of the features included therein.

The above method can be utilized to examine an individual image 10 and estimate a clear path 50 based upon visual information contained within image 10. This method may be repeated at some interval as the vehicle travels down the road to take new information into account and extend the formulated clear path to some range in front of the vehicle's new position. Selection of the interval must update image 10 with enough frequency to accurately supply vehicle 100 with a clear path in which to drive. However, the interval can also be selected to some minimum value to adequately control the vehicle but also not to unduly burden the computational load placed upon processing module 120.

Clear path detection can be accomplished through a single image 10 as described above. However, processing speed and accuracy can be improved with the addition of a second image taken in close time proximity to the original image, such as sequential images from a streaming video clip. A second image allows direct comparison to the first and provides for updated information regarding progression of the vehicle and movement of detected objects. Also, the change of perspective of camera 110 allows for different analysis of features from the first image: a feature that may not have shown up clearly or was indistinct in the first image may display at a different camera angle, stand out more distinctly, or may have moved since the first image, allowing the classification algorithm an additional opportunity to define the feature.

Processing of a second image in relation to the original image 10 can be performed by calculating an image difference. If the image difference of a point of interest, such as a feature identified by radar, is not zero, then the point can be identified as embodying new information. Points where the image difference does equal zero can be eliminated from analysis and computation resources may be conserved. Methods to determine image difference include absolute image intensity difference and vehicle-motion compensated image difference.

Determining an image difference by calculating an absolute image intensity difference can be used to gather information between two images. One method of absolute image intensity difference includes determining equivalent image characteristics between the original image and the second image in order to compensate for movement in the vehicle between the images, overlaying the images, and noting any significant change in intensity between the images. A comparison between the images indicating a change in image intensity in a certain area contains new information. Areas or patches displaying no change in intensity can be de-emphasized in analysis, whereas areas displaying clear changes in intensity can be focused upon, utilizing aforementioned methods to analyze patches on either or both captured images.

Figure 6A:
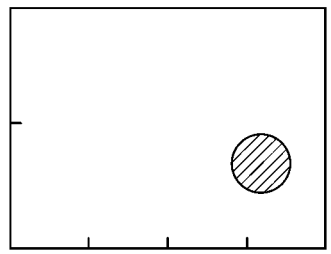
FIGS. 6A, 6B, and 6C illustrate an exemplary determination of an image difference by calculating an absolute image intensity difference in accordance with the disclosure.
Figure 6B:
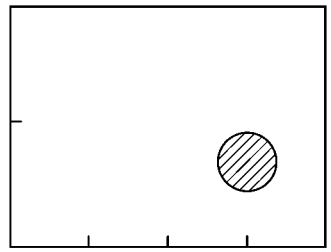
Figure 6C:
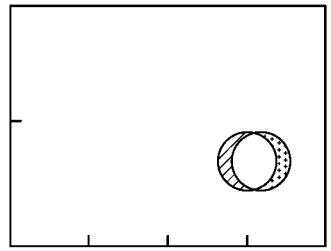

FIGS. 6A, 6B, and 6C illustrate an exemplary determination of an image difference by calculating an absolute image intensity difference in accordance with the disclosure. FIG. 6A depicts an original image. FIG. 6B depicts a second image with changes from the original image. In particular the depicted circular shape has shifted to the left. A comparison of the two images as illustrated in FIG. 6C, an output representing the result of an absolute image intensity difference comparison, identifies one region having gotten darker from the first image to the second image and another region having gotten lighter from the first image to the second image. Such a method can be described as differencing. Analysis of the comparison yields information that some change as a result of movement or change of perspective is likely available in that region of the images. In this way, absolute image intensity difference can be used to analyze a pair of sequential images to identify a potentially not clear path.

Likewise, determining an image difference by calculating a vehicle-motion compensated image difference can be used to gather information between two images. Many methods to calculate a vehicle-motion compensated image difference are known. One exemplary method of vehicle-motion compensated image difference includes analyzing a potential object as both a stationary portion of a clear path and a detected object at the same time. Likelihood analysis is performed on features identified corresponding to the potential object from both classifications at the same time, and the classifications may be compared, for example, through the following logic:

$$\text{Confidence}(i)=\text{ClearPathLikelihood}(i)-\text{DetectedObjectLikelihood}(i) \text{ If\_Confidence}>0, \text{then\_patch}=\text{clearpath} \quad (3)$$

In this exemplary comparison, if confidence($i$) is greater than zero, then the patch containing the feature is classified as a clear path. If confidence($i$) equals or is less than zero, then the patch containing the feature is classified as not a clear path or limited. However, different values may be selected for the confidence level to classify the patch as a clear path. For example, testing may show that false positives are more likely than false negatives, so some factor or offset can be introduced.

Figure 7:
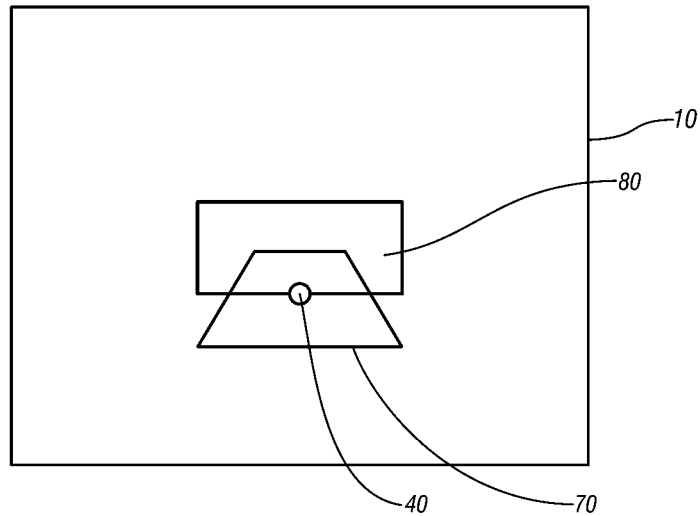
FIG. 7 illustrates an exemplary method to classify a feature as a portion of a clear path and as a detected object at the same time as a method of image analysis in accordance with the disclosure.
Figure 8:
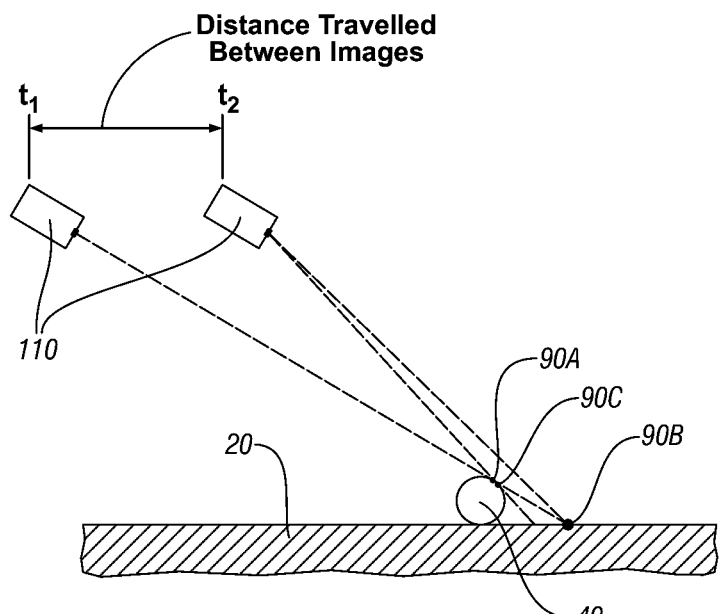
FIG. 8 further illustrates an exemplary method to classify a feature as a portion of a clear path and as a detected object at the same time as a method of image analysis in accordance with the disclosure.

FIG. 7 illustrates one method to classify a feature as a portion of a clear path and as a detected object at the same time as described above in accordance with the disclosure. Image 10 includes object 40, trapezoidal projection 70, and rectangular projection 80. This method utilizes an assumption projecting object 40 as a flat object on the ground within projection 70 to test the classification of the feature as a portion of a clear path. The method also utilized an assumption projecting object 40 as a vertical object within rectangular projection 80 to test the classification of the feature as a detected object. FIG. 8 illustrates comparisons made in data collected between the two images to evaluate the nature of object 40 in accordance with the disclosure. Camera 110 at time $t_1$ observes and captures data from object 40 in the form of a first image. If object 40 is an actual detected object, the profile observed by camera 110 of object 40 at time $t_1$ will correspond to point 90A. If object 40 is a flat object in the same plane as ground 20, then the profile observed by camera 110 of object 40 at time $t_1$ will correspond to point 90B. Between times $t_1$ and $t_2$, camera 110 travels some distance. A second image is captured at time t2, and information regarding object 40 can be tested by applying an algorithm looking at visible attributes of the object in the second image in comparison to the first image. If object 40 is an actual detected object, extending upward from ground 20, then the profile of object 40 at time $t_2$ will be observed at point 90C. If object 40 is a flat object in the same plane as ground 20, then the profile of object 40 at time t2 will be observed at point 90B. The comparison derived through vehicle-motion compensated image difference can directly assign a confidence by application of classifiers based on the observations of points 90, or the comparison may simply point to the area displaying change as a point of interest. Testing of the object against both classifications, as a flat object and as an actual detected object, allows either the area including object 40 to be identified for further analysis through analysis of a patch as described above or direct development of a clear path likelihood and a detected object likelihood for comparison, for example as in logic expression (3) above.

Information available from analysis of the second image can additionally be improved by integration of information regarding movement of the vehicle, such as speed and yaw-rate. Information regarding vehicle motion is available from a number of sources, including the vehicle speedometer, vehicle dynamic sensors or wheel speed sensors, anti-lock braking mechanisms, and GPS location systems. Algorithms may utilize this vehicle movement information, for example, in conjunction with the projections described in FIGS. 7 and 8 to project angles which should exist in a feature laying flat on the ground in the second image based upon data from the first image and the measured movement of the vehicle between the images.

The number of images utilized for comparison need not be limited to two. Multiple image analysis can be performed at multiple iterations, with an object being tracked and compared over a number of cycles. As mentioned above, computational efficiency can be gained by utilizing image difference analysis to identify points of interest and eliminating areas with zero difference from subsequent analyses. Such efficiencies can be used in multiple iterations, for example, saying that only points of interest identified between a first and second image will be analyzed in the third and fourth images taken. At some point, a fresh set of images will need to be compared to ensure that none of the areas showing zero difference have had any change, for example a moving object impinging upon a previously clear path. The utilization of image difference analyses and of focused analyses, eliminating areas identified with zero change, will vary from application to application and may vary between different operating conditions, such as vehicle speed or perceived operating environment. The particular utilization of image difference analyses and of focused analyses can take many different embodiments, and the disclosure is not intended to be limited to the specific embodiments described herein.

Figure 9:
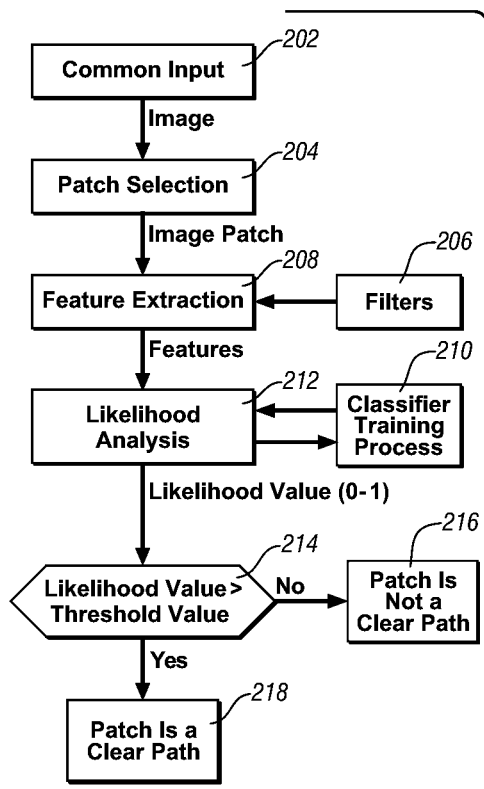
FIG. 9 illustrates an exemplary process to analyze an image through likelihood analysis in accordance with the disclosure.

FIG. 9 illustrates an exemplary process 200 wherein input from a camera is analyzed to determine a clear path likelihood in accordance with the disclosure. Camera input in the form of an image is generated at step 202. At step 204, a patch is selected for analysis from the image. Step 206 represents a filter or set of filters available to process the patch. At step 208, feature extraction is performed upon the selected patch through application of filters available from step 206 and application of other algorithms. It will be appreciated that some features have meaning and others do not, and a process of feature selection can be utilized to identify a group of best features for analysis. Step 210 includes a classifier training process. As mentioned above, classifiers or logic used in developing likelihood values are initially trained offline. Training may optionally be continued in the vehicle based upon fuzzy logic, neural networks, or other learning mechanisms known in the art. These trained classifiers are utilized in step 212 to perform a likelihood analysis upon the features extracted in step 208, and a likelihood value for the patch is developed. This likelihood value expresses a confidence that the selected patch is clear. At step 214, the likelihood value developed in step 212 is compared to a threshold likelihood value. If the likelihood value is greater than the threshold value, then at step 218 the patch is identified as a clear path. If the likelihood value is not greater than the threshold value, then the patch is identified as a not clear path. As described above, process 200 may be repeated or reiterated in a number of ways, with the same image being analyzed repeatedly with the selection and analysis of different patches, and an identified patch can be tracked and analyzed for change over a number of sequential images.

As mentioned above, processing module 120 may include algorithms and mechanisms to actuate autonomous driving control by means known in the art and not described herein, or processing module 120 may simply provide information to a separate autonomous driving system. Reactions to perceived objects can vary, and include but are not limited to steering changes, throttle changes, braking responses, and warning and relinquishing control of the vehicle to the operator.

Figure 10:
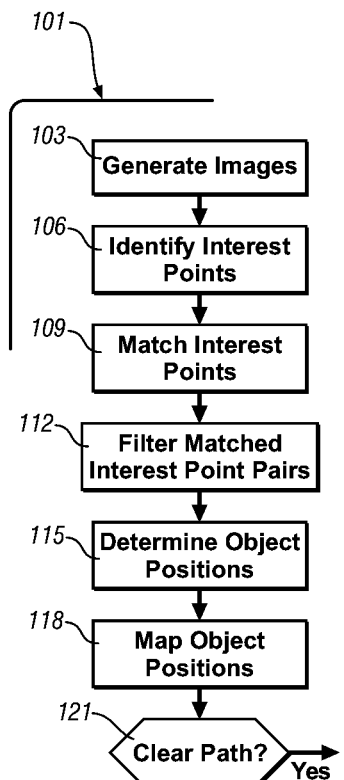
FIG. 10 is a first processing scheme for detecting a clear path, in accordance with the disclosure.

The above method, utilizing analysis of patches, is one method to establish a clear path of travel for a vehicle. Two additional, related processing schemes are disclosed, employing similar methods to analyze pixels instead of patches. A first processing scheme utilizing texture-rich methods to analyze images to identify a clear path is disclosed. FIG. 10 shows a first processing scheme 101 for detecting a clear path, described herein as comprising discrete elements. Such illustration is for ease of description and it should be recognized that the functions performed by these elements may be combined in one or more devices, e.g., implemented in software, hardware, and/or application-specific integrated circuitry.

Processing scheme 101 is an exemplary method to apply texture-rich image analysis of a field-of-view in front of the host vehicle and begins with step 103, wherein images of the field-of-view in front of the vehicle are generated. At step 106, the monitored images are examined for interest points, for example, examining pixel color intensity as described hereinabove and comparing the pixel or a group of pixels with surrounding pixels. Through methods known in the art, interest points can be identified and utilized to accomplish methods described herein. At step 109, sequential images of the field-of-view in front of the vehicle are compared when the vehicle is in motion, and interest points from each image are matched to corresponding points in sequential images which correspond to the same points in the field-of-view, where possible. Matching includes locating corresponding points through template matching or comparing interest points on the sequential images, taking into account movement of the host vehicle, and making a best estimate whether two points represent the same object or feature visible in the field-of-view. While interest points can be matched, not all matched corresponding point pairs represent high quality corresponding point pairs that allow the identification of their three-dimensional positions in the field-of-view for classifications as a clear path for the vehicle to travel through. At step 112, a filter is applied to the matched corresponding point pairs in order to identify high quality corresponding point pairs that can be utilized for three-dimensional position identification with high confidence. At step 115, the high quality corresponding point pairs are analyzed to determine three-dimensional positions of objects represented by the corresponding point pairs. It will be appreciated that corresponding points at different heights as compared to ground level will move differently between sequential images. Analyzing movement of the interest points can yield estimated three dimensional coordinates of the interest points. At step 118, the determined object positions are utilized to map object positions in front of the host vehicle. At step 121, the map is utilized to determine a clear path in front of the host vehicle.

Figure 11:
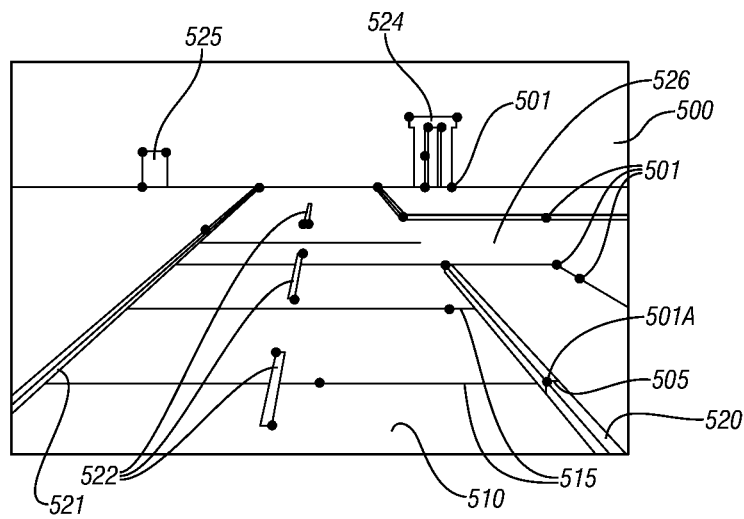
FIG. 11 shows an exemplary current image including an exemplary set of interest points identified on the current image, in accordance with the present disclosure.

FIG. 11 shows an exemplary current image (k) 500 including an exemplary set of interest points 501 identified on the current image (k), each interest point 501 corresponding to a pixel. The processing module 120 preferably identifies interest points 501 on each image generated including the current image (k) 500 and a previous image (k−1). An interest point 501 is an identifiable pixel on an image and is associated with a set of visual information, i.e., texture-rich features, and is associated with objects located in the field-of-view. The exemplary field-of-view or view depicted in FIG. 11 includes a road surface 510, sections in the road surface 515, curbs 520 and 521, lane markers 522, intersecting lane 526, and buildings 524 and 525. Candidate interest points 501 are identified in the view by interest point extraction programming from which a set of interest points 501 may be selected. The interest point extraction programming is executed on the images by one of several known methods, e.g., a scale-invariant feature transform (SIFT), methods employing corner detection or other shape detection, or a Sobel filter. The interest point extraction programming is preferably executed in the processing module 120, but may be combined in one or more devices, e.g., implemented in software, hardware, and/or application-specific integrated circuitry. The interest point extraction programming locates candidate interest points 501 in each image corresponding to predetermined identifiable texture-rich features, e.g., pixels indicating an edge, pixels indicating a transition in the visual data, wherein potentially significant features can be identified in the view. In the exemplary view of FIG. 11, of the many identified interest points 501 identified, one point, 501A, is identified at a corner formed at a section 505 in curb 520.

After identifying candidate interest points 501, the interest point extraction programming may filter the candidate interest points by removing redundant candidate interest points, i.e., candidate interest points corresponding to a same feature. For example, the interest point extraction programming may filter multiple candidate interest points corresponding to an edge, resulting in less candidate interest points corresponding to the edge. The remaining set of candidate interest points are the interest points for the image. In one embodiment, filtering redundant candidate interest points is executed for computational efficiency.

Once the interest points 501 in a current image (k) 500 are identified, the processing module 120 matches the set of interest points from the current image (k) with a set of points identified from the previous image (k−1) to determine a set of matched point pairs, corresponding to step 109 in process 101.

Figure 12:
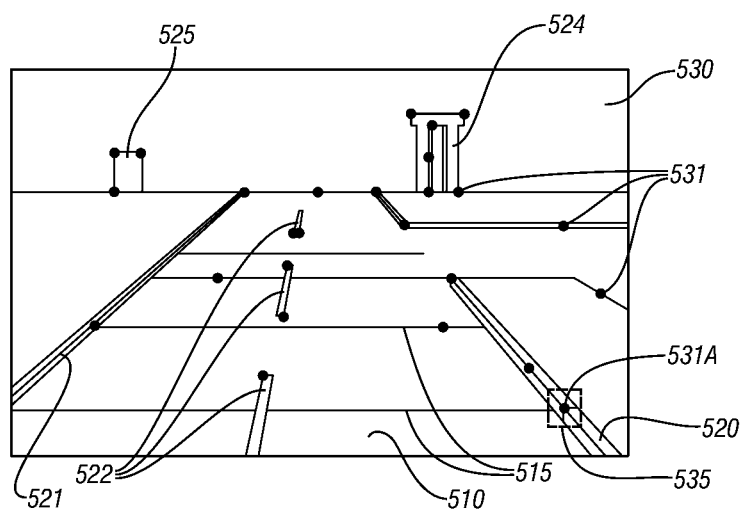
FIG. 12 shows an exemplary current image captured subsequent to the image depicted in FIG. 11, in accordance with the present disclosure.

A first method to determine a set of matched point pairs includes using correspondence matching programming to match interest points from a current image (k) and a previous image (k−1). The processing module 120 matches the set of interest points from the current image (k) with a set of interest points identified in the previous image (k−1) to determine a set of matched interest point pairs. FIG. 12 shows an exemplary current image (k) captured subsequent to the image depicted in FIG. 11. The exemplary current image (k) 530 represents an image captured sequentially to the image depicted in FIG. 11, wherein the perspective of the viewer has progressed slightly along the viewed road between the images. In this exemplary situation, image 500 of FIG. 11, although a current image (k) at the time it was captured, now can act as a previous image (k−1) to current image (k) 530. The exemplary view depicted in FIG. 12 includes road surface 510, sections in the road surface 515, curbs 520 and 521, lane markers 522, and buildings 524 and 525, as depicted in FIG. 11, with slightly different perspectives of every feature in the view. In the exemplary view of FIG. 12, many identified interest points 531 are identified according to methods described above, and one point, 531A, is identified at a corner formed at a section 505 in curb 520. It will be noted that interest points 531 identified in image 530 are not necessarily directly corresponding to interest points 501 identified in image 500. Points 531 identified in image 530 are processed and filtered as described in association with points 501, as described in association with FIG. 11. Preferably, several interest points 531 from the set of interest points from the current image (k) 530 are matched with an interest point 501 from the set of interest points identified from the previous image (k−1) 500 to determine a plurality of matched point pairs. Each interest point comprising a matched point pair is expected to correspond to a same feature associated with an object in the view. To determine the set of matched point pairs, the set of interest points 531 from the current image (k) are compared to the set of interest points 501 identified from the previous image (k−1) by one of several known correspondence matching programming, e.g., a scale-invariant feature transform (SIFT) feature matching programming and optical flow programming. The correspondence matching programming is preferably executed in the processing module 120, but may be combined in one or more devices, e.g., implemented in software, hardware, and/or application-specific integrated circuitry. The resulting matched point pairs correspond to a same feature located on both the current image (k) and the previous image (k−1) wherein the same feature is associated with a same object in the view.

A second method to determine a set of matched point pairs includes using template matching programming to match interest points from the current image (k) and the previous image (k−1). In one embodiment templates are generated using a predetermined pixel region neighboring an interest point. An exemplary region 535 is depicted in association with interest point 531A in FIG. 12. The template matching may be determined using one of multiple methods, including one of several known template matching programming methods to find the corresponding points of interest in the previous image, e.g., Lucas-Kanade or Horn-Schunck. Preferably, the templates neighboring an interest point in a current image and compared with templates neighboring an interest point in a previous image. When the template matching programming determines that the templates match, the interest points are included in the set of matched point pairs. The resulting matched point pairs correspond to a same feature located on both the current image (k) and the previous image (k−1) wherein the same feature is associated with a same object in the view.

Figure 13A:
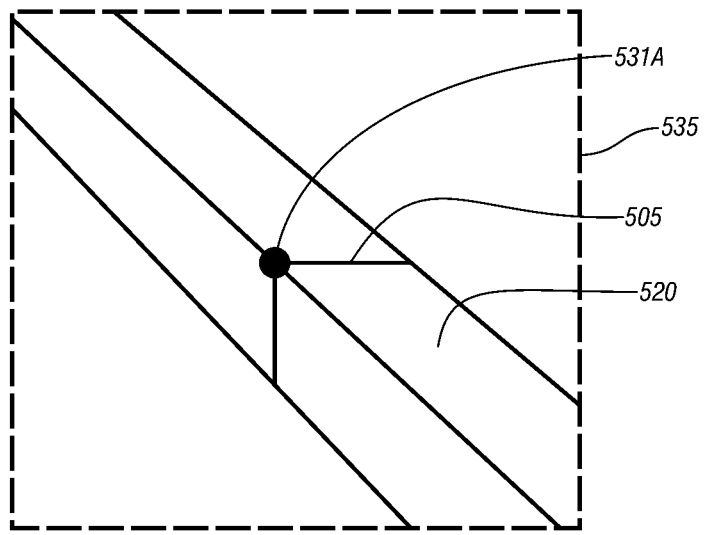
FIGS. 13A and 13B show an exemplary matched point pair, the matched point pair comprising an interest point from a current image and a corresponding interest point from a previous image, and an exemplary pixel region surrounding the points, in accordance with the present disclosure.
Figure 13B:
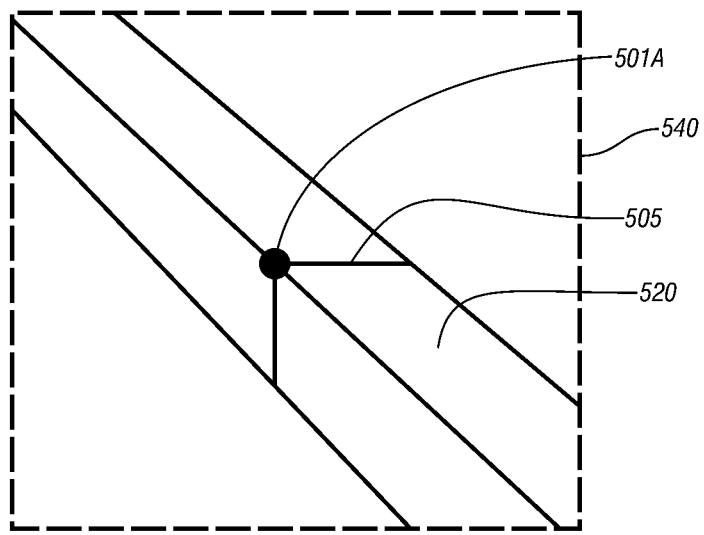

FIGS. 13A and 13B show an exemplary matched point pair, the matched point pair comprising interest point 531A from the current image (k) 530 and a second interest point 501A from the previous image (k−1) 500, and an exemplary pixel region surrounding the points. According to the method described above, pixel region 535 around interest point 531A is depicted in FIG. 13A. As described above, interest point 531A is a point identified at a corner of section 505 between portions of curb 520. Pixel region 535 is selected around point 531A and preferably includes discernable features, textures, or patterns that can be used to positively identify the region. FIG. 13B similarly depicts interest point 501A and a pixel region 540 around the interest point. Because of the change in perspective between image 500 and image 530, it is possible that pixel region 535 and pixel region 540 can include some differences, but applying methods described above, a comparison of the pixel regions and identifying features therein can be utilized as one method to confirm with some confidence that interest points 531A and 501A represent the same feature within the view captured in images 500 and 530 and may be treated as a matched pair.

After the matched point pairs are determined, the processing module 120, by applying filters removing low quality matched corresponding point pairs indicative of poorly matched or mismatched pairs, selects high quality, preferential matched point pairs from the set of matched point pairs, as described in exemplary step 112 above. Preferential matched point pairs may be selected based upon quality control criteria. In one embodiment, matched point pairs are analyzed and identified as preferential matched point pairs after satisfying each criterion.

A first criterion is met when a distance between points of a matched point pair is less than a threshold. The distance is determined based upon the location of the points as if they were located on a same two-dimensional image coordinates. The threshold may be predetermined and location-dependent or dynamic based upon speed of the vehicle. A second criterion is met when both points of a matched point pair are a predetermined threshold distance from an image boundary. Due to the perspective of the camera to objects at the edges of the image boundary and vehicle motion, points too close to the edge either cannot locate a corresponding point, which may be located outside of the perspective of the camera or can create distorted estimates of object locations. Additionally, under normal vehicle operation in a forward direction, the probability of a vehicle needing information regarding a clear path toward the extremes of the view is small. A third criterion is met when a difference in color between a predetermined area neighboring each point of a matched point pair is less than a threshold difference in color. Utilizing the exemplary pixel regions defined in FIG. 13, a difference in color between the pixel regions 535 and 540 can be used to increase confidence in the matched pair. Each pixel within each of the regions can be assigned a number value based upon its corresponding color. The assigned number may be based upon a bit value determined while capturing the image or may be based upon an indexed color referencing a predetermined palette. The processing module 120 calculates absolute differences between the assigned number values within the first area 501 and the second area 502 pixel-by-pixel, and sums the differences, which is the difference in color. The difference is compared with the threshold difference. If the difference is less than the threshold difference the third criterion is met. The threshold difference in color can be selected by any method sufficient to calibrate accurate road presence or clear path estimation. Different threshold differences in color can be utilized based upon lighting levels exterior to the vehicle, weather, speed of the vehicle, or any other factors that affect accurate estimation of clear path presence based upon differences in color. By judging whether the areas around the interest points are similar, a judgment can be made regarding whether the same area including the feature represented by the interest points is being analyzed in both images.

It will be appreciated that the three criteria described above are exemplary criteria useful to judge matched pairs, but some portion of these criteria or additional unnamed, similar criteria can be utilized to judge validity of matched pairs. Selection of criteria to judge matched pairs can additionally be made based upon conditions such as light level present outside the vehicle, weather, speed of the vehicle, and any other factor affecting an ability to judge matched pairs or an urgency to quickly and accurately define a clear path.

Figure 14:
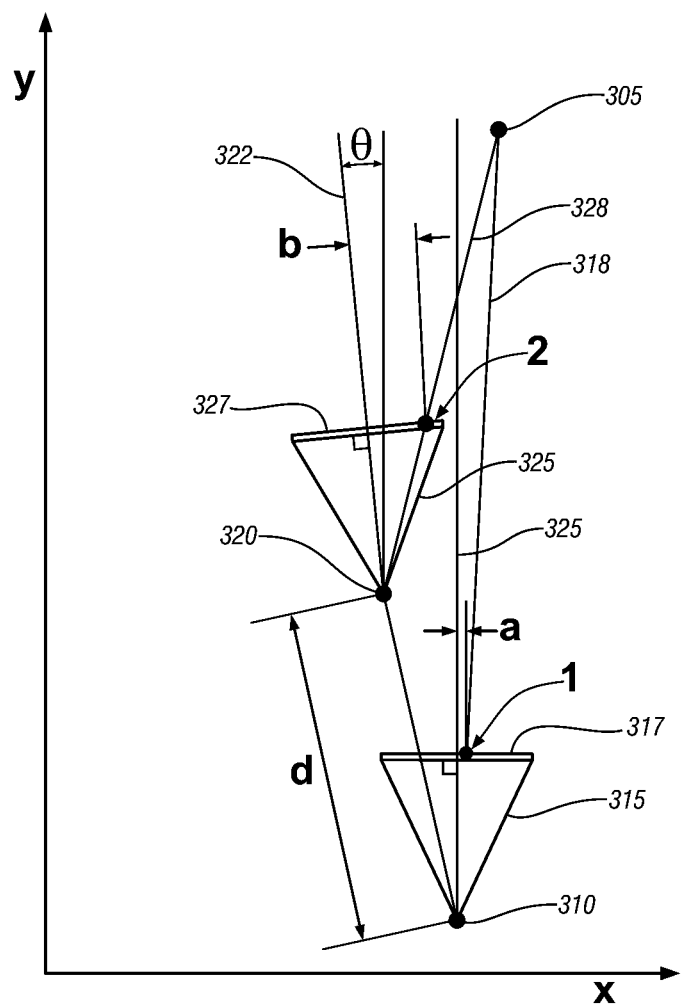
FIG. 14 graphically illustrates use of an exemplary current image, an exemplary previous image, and operation of a host vehicle to determine the position of a viewed feature, in accordance with the present disclosure.

After selecting the preferential matched point pairs, the processing module 120 determines positions of a plurality of points associated with features of objects in the view with respect to the vehicle 100, as described in exemplary step 115 above. FIG. 14 graphically illustrates use of an exemplary current image, an exemplary previous image, and operation of a host vehicle to determine the position of a viewed feature. Object position in a horizontal frame of reference and a height of the object as compared to a ground level can be determined based upon the preferential set of matched point pairs within sequential images 317 and 327 (the matched pair demonstrated in this figure through points 1 and 2), a distance (d) the vehicle 100 traveled from a first position 310 to a second position 320, and vehicle yaw (θ). The processing module 120 executes one of several known triangulation methods to determine the position of the point with respect to the vehicle 100 and a height of the point. In FIG. 14, a field-of-view 315 from 310 including an image k−1 317 is depicted, and a field-of-view 325 from 320 including an image k 327 is depicted. Distance d is depicted describing a distance that an observer has traveled between points 310 and 320. Lines longitudinally oriented to fields of view 315 and 325 are represented by lines 312 and 322, respectively. An angular change in orientation or yaw (θ) is depicted describing an angle between lines 312 and 322. Distance d can be determined an exemplary vehicle by tracking speed of the vehicle through a sample time between the time at 310 and the time at 320. Similarly, θ can be determined by tracking a yaw rate of the vehicle through the sample time. Object being viewed 305 is depicted, and lines 318 and 328 are depicted describing lines of view from points 310 and 320 to object 305, respectively. Points 1 and 2 are depicted upon images 317 and 327 where lines 318 and 328 intersect images 317 and 327, respectively. Distance (a) can be defined describing a location of point 1 upon image 317, and distance (b) can be defined describing a location of point 2 upon image 327. It will be appreciated that FIG. 14 represents an overhead view wherein a position of object 305 can be defined in a horizontal plane, and similar computations in a side view of the same objects can be utilized to define a vertical position of object 305 with relation to a known ground level for the observer. By applying well known methods of triangulation, positional data such as distances a and b from sequential images and vehicular data such as vehicle speed, vehicle yaw rate, and sample time can be utilized to locate a position of a viewed object in relation to the vehicle and determine relative motion of the object in relation to the vehicle. These methods of triangulation can yield a position of the object in a horizontal plane and a height of the object in relation to a ground level.

Figure 15:
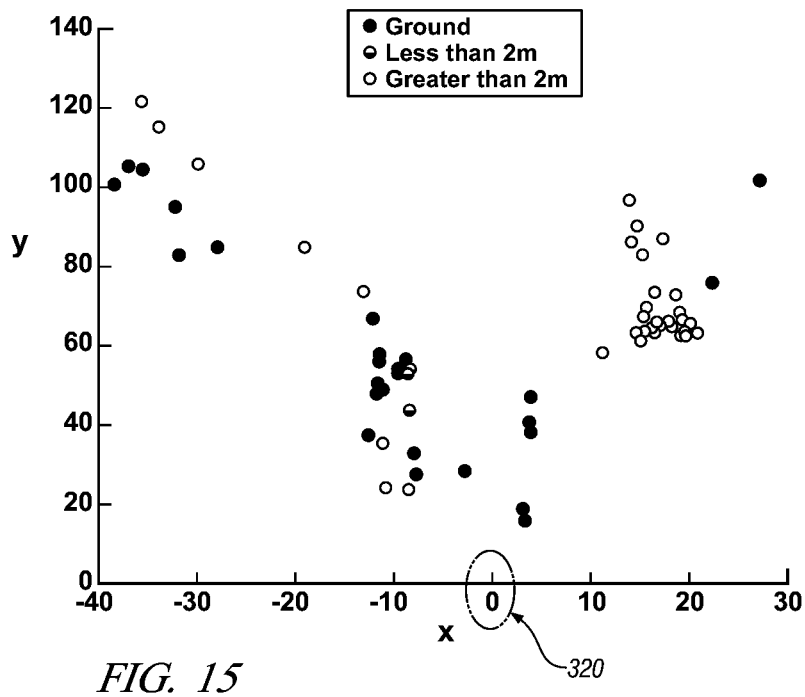
FIG. 15 graphically illustrates an exemplary overhead map describing vertical positions of interest points at x and y coordinates in front of the host vehicle, in accordance with the present disclosure.

Once the position and height are determined, the processing module 120 may plot the points on an overhead map, as described in exemplary step 118 above. FIG. 15 graphically illustrates an exemplary overhead map describing vertical positions of interest points at x and y coordinates in front of the host vehicle. Position <0, 0> on the x axis and y axis corresponds to the second position 320 of the vehicle 100 described hereinabove, or the current position of vehicle 100. Preferably, object height is classified into predetermined categories. For example, objects with minimal height, e.g., below a predetermined threshold, may be classified as ground, objects exceeding ground height but less than a second predetermined threshold may be classified into a second category which is close to and preferably less than a vehicle height, and objects greater than the second predetermined threshold may be classified into a third category. As FIG. 15 shows, objects with minimal height are classified as ground (Ground), objects exceeding ground height but less than a 2 meter threshold are classified into the second category (Less than 2 m), and objects greater than the 2 meter threshold are classified into the third category (Greater than 2 m).

After plotting the objects on the map, the processing module 120 detects a clear path based upon features plotted in the map, as described in exemplary step 121 above. The term "clear path" as used herein is to be given its ordinary and customary meaning to a person of ordinary skill in the art (and it is not to be limited to a special or customized meaning), and refers without limitation to a path free of objects exceeding a threshold, e.g., a path free of objects classified in the above-mentioned second and third categories. Features of objects that are classified in predetermined categories, e.g., the second and third category described hereinabove are identified by the processing module 120 as not-clear areas, i.e., not desirable for vehicle travel. Preferably, a predetermined area neighboring each object classified in the predetermined categories is identified by the processing module 120 as not-clear area. The processing module 120 may determine that a clear path is present on the map using one of multiple methods. A first method for determining a clear path comprises comparing an anticipated path with the map including the not-clear areas. If the anticipated path does not intersect any not-clear areas then the processing module 120 determines that the anticipated path is a clear path. However, if the anticipated path intersects a not-clear area then the processing module 120 determines that a clear path is not present. A second method for determining a clear path comprises using the not-clear areas in the map to determine a clear path. Any path not intersecting the not-clear areas may be used as a clear path.

The above method utilizes sequential images to establish a map of object positions and vertical heights in front of the vehicle, such that a clear path can be defined. It will be appreciated that in any two given images, a particular object might not be classified as including two high quality interest points sufficient to be mapped in that particular analysis. However, the above analysis occurs multiple times per second of vehicle travel. As the vehicle travels forward through the clear path, different perspectives upon an object will be gained and a large number of images will be analyzed. Travel over a path and analysis of the multiple iterative images through that path build a confidence through the analyses that no object contradicting the clear path exists in the identified clear path.

Figure 16:
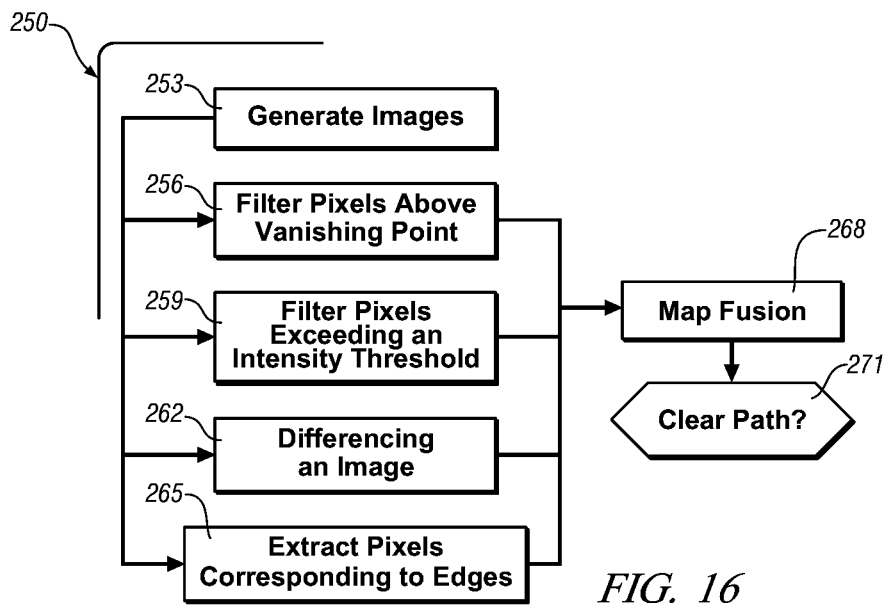
FIG. 16 shows a second processing scheme for detecting a clear path, in accordance with the present disclosure.

FIG. 16 shows a second processing scheme for detecting a clear path. Whereas the first processing scheme described herein utilizes texture rich methods, analyzing pixelated features that describe distinct interest points based upon a contextual view within the image, the second disclosed processing scheme can be described as an exemplary texture-less method of image analysis, filtering from an image non-conforming regions of the image as not belonging to a planar, consistent road surface. By filtering from an image non-conforming regions, a clear surface can be identified from the remaining image as a potential clear path for the vehicle to travel. Process 250 is illustrated in FIG. 16, and described herein as comprising discrete elements. Such illustration is for ease of description and it should be recognized that the functions performed by these elements may be combined in one or more devices, e.g., implemented in software, hardware, and/or application-specific integrated circuitry. For example, the process 250 may be executed as one or more algorithms in the processing module 120. The process 250 for detecting a clear path comprises creating a plurality of filtered images and fusing the filtered images together to determine a clear path.

Exemplary process 250 is disclosed, including steps to employ an exemplary texture-less method of clear path detection. Process 250 begins at step 253, wherein images are generated. Steps 256, 259, 262, and 265 describe alternate exemplary methods to filter an image to identify a location of a clear path including a road surface. It will be appreciated that each of the methods processes the image in one way to help identify the clear path. A process could be employed with some portion of the four exemplary methods or a process could be employed to include unnamed but similar methods to process the image. Any method can be employed that filters within an image a clear surface upon which a road surface can be estimated from other portions of the image that do not indicate a potential road surface. Step 256 applies an exemplary method to filter an area below a horizon or vanishing point, including a road surface that can be driven upon, from an area above the horizon or vanishing point, including sky and other vertical features that cannot be part of a road surface. Step 259 applies a filter based upon variance in pixel intensity, based upon a premise that a road surface will include a large surface with a visual intensity very common across the surface. Step 262 applies a filter based upon differencing sequential images, allowing analysis of changes between the images. Step 265 applies a filter based upon identifying pixels representing edges or transitions in the visual data. Applying the various methods in parallel, the results can be the fused into a single map of the image in step 268 and analyzed for visual data indicative of a clear path of travel in step 271.

A first filtered image is created using a vanishing point, as is described in exemplary step 256 above. The term "vanishing point" as used herein is a broad term, and is to be given its ordinary and customary meaning to one ordinarily skilled in the art, and refers to an infinite far point on the horizon that is intersected by multiple parallel lines on the ground in the view. Identifying a road surface creating a clear path on which to drive is necessarily below the vanishing point or horizon line. Filtering images to only analyze an area below the horizon line helps to clarify the pixels being analyzed to identify a road surface from irrelevant pixels. As one skilled in the art appreciates, there are many known methods for determining a vanishing point and corresponding horizon line. One known method comprises determining the vanishing point based upon a point where the lane markers on the left and right of a host vehicle intersect each other. The horizon line is determined based upon the vanishing point. The first filtered image consists of pixels on the current image below the horizon line.

Figure 17:
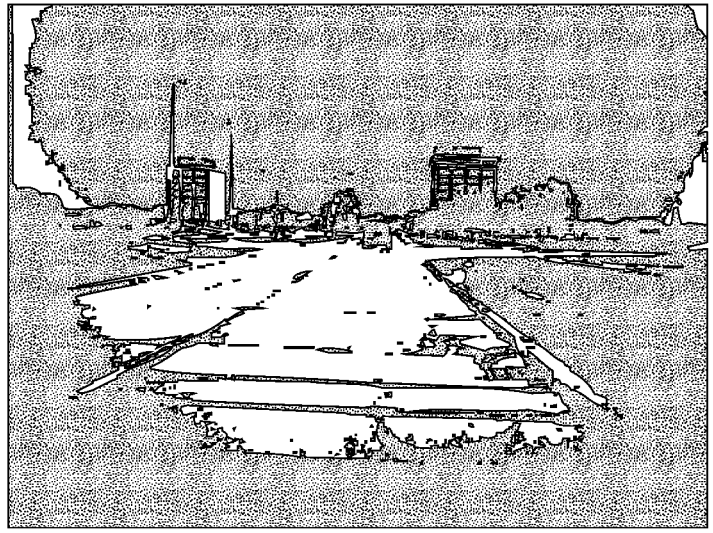
FIG. 17 shows an exemplary filtered image based upon pixel color intensity, in accordance with the present disclosure.

The processing module 120 creates a second filtered image based upon pixel color intensity of the plurality of pixels comprising the current image (k), as is described in exemplary step 259 above. FIG. 17 shows an exemplary second filtered image based upon pixel color intensity. The second filtered image comprises pixels selected from the plurality of pixels. A number of methods to filter pixels are envisioned. The processing module 120 compares each color intensity value of a pixel with an associated color distribution mean e.g., a red, green, and blue color distribution mean. The color distribution means are an average color intensity distribution for an associated color intensity associated with pixels previously identified in clear paths. The color distribution means may additionally be based upon historically gathered color distribution means of clear path pixels of the associated colors. A pixel is selected for the second filtered image when each color intensity value of the pixel is less than a color intensity threshold from the associated color distribution mean. When one color intensity value of the pixel is greater than a color intensity threshold from the associated color distribution mean, the pixel is excluded from the second filtered image. The color distribution mean for the associated color intensity is an average color intensity value distributed in the image. The color distribution means are initially predetermined. In one embodiment, the processing module 120 adapts the color distribution mean for each associated color intensity based upon the color intensity distributions in a predetermined number of images.

As described hereinabove, each pixel comprises a plurality of color intensity values. Preferably, the color intensity value is compared with the associating color distribution mean. For example, for a pixel created using the RGB color model, a first bit set associated with a red color intensity is compared with the color distribution mean associated with the red color intensity, the bit set associated with the green color intensity is compared with the color distribution mean associated with the green color intensity, and the bit set associated with the blue color intensity is compared with the color distribution mean associated with the blue color intensity. If the difference between each color intensity comprising the pixel and the associated color distribution mean is less than a color intensity threshold, then the pixel is used for the second filtered image.

Using the RGB color model, each pixel comprises a first, second, and third color intensity value. A first color intensity is a red intensity, a second color intensity is a green intensity, and a third color intensity is blue intensity. The pixel for the second filtered image is selected from the plurality of pixels comprising the current image (k) when the difference between a red intensity of the pixel and a red color distribution mean is less than a red intensity threshold, and the difference between a green intensity of the pixel and a green color distribution mean is less than a green intensity threshold, and the difference between a blue intensity of the pixel and a blue color distribution mean is less than a blue intensity threshold.

The following equation expresses this process using the RGB color model:

$$|R-R_M|<threshold_R \text{ and } |G-G_M|<threshold_G \text{ and } |B-B_M|<threshold_B \quad (4)$$

wherein
R is a red color
G is a green color,
B is a blue color,
$R_M$ is a color distribution mean for the red color,
$G_M$ is a color distribution mean for the green color,
$B_M$ is a color distribution mean for the blue color,
$threshold_R$ is a red intensity threshold,
$threshold_G$ is a green intensity threshold, and
$threshold_B$ is a blue intensity threshold.

One skilled in the art will appreciate that Equation 4 above may be configured to be used with multiple other color models including the CMYK, YUV, and LAB color models.

The processing module 120 creates a third filtered image using the current image (k) and the previous image (k−1) by differencing the images, as is described in exemplary step 262 above. In an exemplary process to create a differenced image, a third filtered image is created as an image difference of the current image (k) and the previous image (k−1) and comprises a pixel by pixel comparison representing the difference between the current image (k) and the previous image (k−1). Such a process is described above in association with FIGS. 6A-6C. A first method for determining the third filtered image comprises determining a difference between individual pixels on a current image (k) and corresponding individual pixels on the previous image (k−1). The difference may be determined by subtracting color intensity values associated with a pixel from corresponding color intensity values to determine a color intensity difference, e.g., subtracting the red color intensity value of a first pixel on the current image (k) from the red color intensity value of a first pixel on the previous image (k−1). The resulting color intensity difference comprises the pixel value and corresponds to the difference between the pixel on the current image (k) and the previous image (k−1). Each pixel value may be stored in an array corresponding to the third filtered image. In one embodiment, an absolute value of the difference is determined and stored in the array. The resulting array comprises values representing the difference between the two images and comprises the image difference. After determining the array, the processing module 120 removes values representing pixels that changed less than the predetermined threshold. The resulting values can, in one embodiment, be replaced with a predetermined value, e.g., one, to represent on a resulting image a clear map of identified differences between the two utilized images.

A second exemplary method for determining the third filtered image is based upon differencing images is described. A determination can be made by comparing the current image (k) and a motion adjusted previous image (k−1), and differences between these images can be used to map objects not fitting a particular model used to generate the motion adjusted image. One exemplary model to generate the motion adjusted image includes utilizing triangulation methods, such as the methods describing in association with FIG. 14, information regarding the motion of the vehicle, and an assumption that all detected points are at ground level to predict motion of objects in the previous image (k−1). By using an assumption that all objects in the image are at ground level, predictions of motion of the objects in the resulting image are consistent with the previous image existing as an entirely flat image existing at ground level. Comparison of this resulting motion adjusted previous image (k−1) with the actual current image (k), including perspective changes upon objects not at ground level, allows for identification of all objects or features in the viewed images that are not on the ground level. By subtracting pixels in the compared images, for example according to the first exemplary process for determining the third filtered image described above, pixels representing objects not on the ground level can be identified by the non-zero values or values exceeding a determinative threshold. In this way, the processing module 120 can determine the third filtered image as described hereinabove using the current image (k) and the motion adjusted previous image instead of the previous image (k−1).

Figure 18:
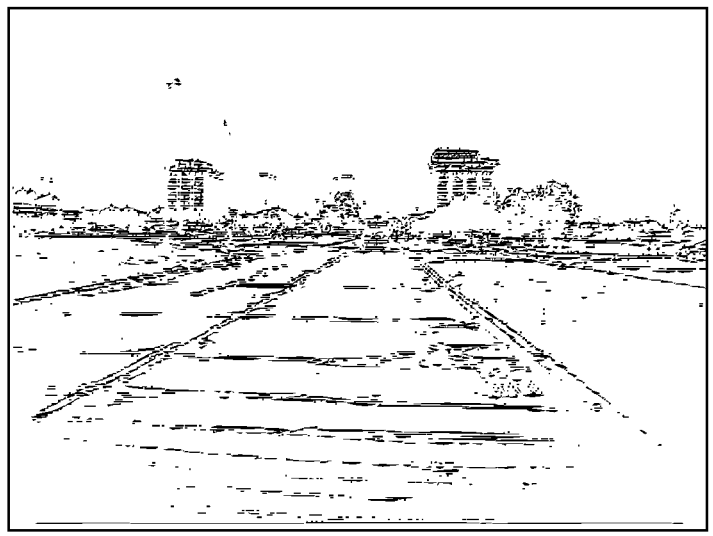
FIG. 18 shows an exemplary filtered image utilizing an edge recognition method, in accordance with the present disclosure.

The processing module 120 creates a fourth filtered image based upon color intensity values of the plurality of pixels comprising the current image (k), as described in exemplary step 265 above. FIG. 18 shows a fourth filtered image utilizing an edge recognition method. The fourth filtered image comprises edges of the current image (k). To create the fourth filtered image, the processing module 120 extracts pixels from the image based upon color intensity values that correspond to edges using one of several known edge detection filters, e.g., a Sobel filter. The edge detection filter is preferably executed in the processing module 120, but may be combined in one or more devices, e.g., implemented in software, hardware, and/or application-specific integrated circuitry. In one embodiment, each pixel is analyzed using a Sobel operator. The Sobel operator computes a gradient vector of color intensity at each pixel resulting in a direction of the largest possible increase from light to dark and the rate of change in that direction. Points corresponding to a rate of change exceeding a threshold and corresponding to gradient vectors at nearby pixels indicate edges and are included in the fourth filtered image. Those pixels may be replaced with a predetermined pixel color, e.g., black.

After creating the plurality of filtered images, the processing module 120 fuses the filtered images together to determine pixel locations corresponding to a clear path, as described in exemplary step 268. The fused filtered image comprises an image containing pixels contained in all of the plurality of filtered images, i.e., only pixels contained at a particular pixel location in each of the plurality of filtered images are included in the fused filtered image. Fusing the filtered images together comprises determining pixel locations included on each of the plurality of filtered images. Each pixel location is compared with corresponding pixel locations on each of the filtered images. When each of the plurality of filtered images contains a pixel at a corresponding pixel location, that pixel is included on a fused clear path map representing a clear surface on the road. The fused clear path is used to detect a clear path for the vehicle 100. Pixels on the fused clear path map correspond to desirable driving locations in the view. Locations on the fused clear path map without pixels correspond to undesirable driving locations in the view.

Figure 19:
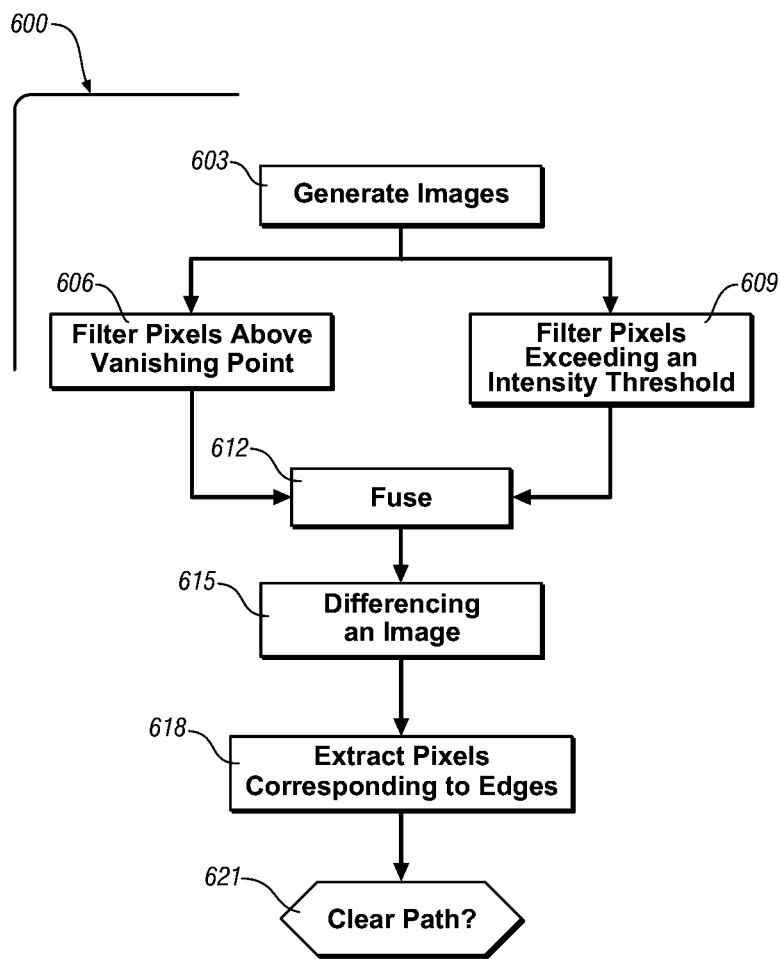
FIG. 19 depicts an alternate exemplary process for the second processing scheme, in accordance with the present disclosure.

Process 250, described in FIG. 16, applies various methods to images in parallel to identify features in a view relevant to defining a clear path. However, it will be appreciated that these methods need not be performed in parallel, but rather the methods can be used to process images sequentially in steps to identify features in a view relevant to defining a clear path. An exemplary process 600 for the second processing scheme is depicted in FIG. 19. Process 600 initiates by generating a sequence of images at step 603. Each image is delivered in parallel to two steps, and the results from the two steps are fused and made available for subsequent steps in the process. The parallel steps include step 606, wherein a first filtered image according to filtering pixels by the vanishing point method described above in order to filter from processing the portions of the images that cannot represent a road surface, and step 609, wherein a second filtered image by filtering pixels according to intensity, as described above, is utilized to filter from processing portions of the images describing features inconsistent with a road surface. A fused image of the first filtered image and the second filtered image is created in step 612, the fused image including only a portion of the image below the vanishing point and including pixels with intensity consistent with a road surface. Sequential fused images are used, in step 615, to create a third filtered image using one of the differencing methods described above. In step 618, the third filtered image is utilized to create a fourth filtered image using the edge extraction methods described above. The results of process 600 can then be analyzed for visual data indicative of a clear path of travel.

Processes 250 and 600 illustrate two exemplary arrangements in which filtering methods can be utilized in combination to process a sequence of images to identify a clear path. However, it will be appreciated that such combinations can take many forms, steps can applied in different orders, and fewer or additional filters can be used in different combinations. Additionally, filters can be utilized selectively or configurations of processes can be utilized selectively, for example, with different combinations being utilized in the daytime and others being utilized in the night. For example, some combinations can continue to analyze road surfaces illuminated by headlights whereas other methods might not be useful without an entirely illuminated view. In another example, different combinations can be utilized when rain or snow is present on the road. For example, some methods and analysis methods might continue to be useful with a light coating of snow, for example, identifying tire paths in the snow as potential clear paths, whereas other methods might not be useful where a white covering hides most identifiable features. In another example, different combinations can be utilized when additional information is made available, for example, with infrared, radar, or GPS data augmenting or facilitating filtering of the images based upon the additional information. A number of combinations of filtering methods are envisioned, and the disclosure is not intended to be limited to the particular embodiments described herein.

As described above, a first processing scheme, employing texture-rich methods, and a second processing scheme, employing texture-less methods, are described, each scheme enabling identification of road features useful to describe a clear path in the view of the vehicle. However, it will be appreciated that a single analysis based upon either scheme can yield ambiguous results, for example, wherein particular lighting conditions, shadows from another vehicle, heat caused distortion of the road surface, or other similar issues can cause portions of a road surface to be misidentified as not conforming to the rest of the road surface. One method to resolve ambiguous results is accomplished by analyzing iterative images as the vehicle travels along the road. It will be appreciated that as a vehicle travels along a road, hundreds of images taken in quick succession can be analyzed of a particular section of road. As the vehicle travels forward, different lighting and exposure of the road surface as a result of different viewing perspectives will be observed. Travel over a path and analysis of the multiple iterative images through that path can build confidence through the analyses that the particular portion of the road surface is correctly estimated as a clear path.

Another method to resolve ambiguous results of either scheme is to utilize both schemes and fuse the results, utilizing the combination of the two schemes to increase confidence of identification of a clear path. Each of the schemes has advantages over the other scheme in different aspects of clear path detection. For example, the exemplary texture rich method excels at detecting objects distinctly standing up from the ground level with rich textures. This method positively identifies objects detectable at different heights and yields a map of areas that a vehicle should not travel lest the objects collide with the vehicle. In another example, the exemplary texture-less method excels at identifying a region wherein pixels identify a commonly appearing surface. This method positively identifies a region wherein a road surface is likely to exist and maps the boundaries of this surface.

The first scheme and the second scheme can be fused in a number of ways. An image with identified points and determined heights identified with texture-rich methods can be overlaid with a filtered image generated by texture-less methods, and agreement of the two methods can be used to define a clear path through the overlaid image. In an alternative method to fuse the two schemes, the data from each of the two schemes can be used to project information upon a programmed overhead map of an area in front of the vehicle, and this overhead map including data gained from analysis of the two schemes can include building confidence indications for regions of the map. In an alternative method to fuse the two schemes, one scheme can be utilized as a primary or dominant scheme, and the second scheme can be utilized or activated to analyze regions in the view identified as ambiguous or unclear. In any method to fuse the two schemes, strengths of one processing scheme can be used to reduce weaknesses of the other processing scheme. If both schemes concur that the path is clear, then the processing module employing the schemes may determine with increased confidence that the path is desirable for the vehicle to traverse. A number of methods to fuse the identified schemes are envisioned, and the disclosure is not intended to be limited to the particular embodiments described herein. Additionally, either scheme or both schemes can be combined with the method employed above utilizing analysis of patches.

An example-based method can be utilized alternatively or additionally to define a clear path based upon an input image. An exemplary example-based method collects a number of sample images of views, defining a clear path for each of the sample images, matches a current image to one or more of the sample images, and determines a clear path based upon the matching. Matching the current image to one or more of the sample images can be accomplished, for example, by extracting features from each of the sample images, extracting features from the current image, comparing the extracted features from the current image to a database of extracted features from the sample images, and selecting matching sample images to the current image. A clear path can be selected from the best matching sample image or can be determined based upon a combination of the closest matches to the current image.

Hierarchical configurations of multiple clear path detection algorithms may be incorporated into this disclosure, including algorithms arranged based upon computational intensity. Less computationally intensive detection methods can identify clear paths in the image and leave remaining sections of the image not identified as a clear path for more computationally intensive analysis thereby increasing computational efficiency for clear path identification. The particular methods utilized and the hierarchical structure of the particular hierarchical method used can differ or change. In an exemplary hierarchical configuration, a patch-based clear path detection method identifies clear paths in the image before a pixel-based clear path detection method analyzes the remaining sections of the image not identified as a clear path by the patch-based method. In one embodiment, a second exemplary hierarchical layer utilizing an example-based method further analyzes sections not identified as a clear path by the pixel-based method. However, a number of different hierarchical configurations are envisioned, and the disclosure is not intended to be limited to the particular embodiments described herein.

One skilled in the art will recognize that lighting normalization may be applied to the captured image data. Normalization is a process which changes the range of pixel intensity values. The purpose of the normalization is to bring the image into a range that is more suitable for machine process to improve the reliability. For example, each pixel value is normalized to be a zero mean and unit variance to enhance the image contrast, specifically in a low lighting environment or when contrast is poor due to glare.

The filters and algorithms described hereinabove may take many forms. Filtering algorithms utilized to extract features often search the available visual information for characteristic patterns in the data, defining features by line orientation, line location, color, corner characteristics, other visual attributes, and learned attributes. Attributes may be developed experimentally, empirically, predictively, through modeling or other techniques adequate to accurately train distinguishing attributes. Learned attributes may be learned by machine learning algorithms or fuzzy logic within the vehicle adapting over time. Additionally, learned attributes or learned landmarks can be gathered from repetitive travel of a vehicle over a route and utilized in clear path identification.

Embodiments are described above for detecting a clear path of travel for a vehicle utilizing analysis of a plurality of images generated by the camera device located upon the vehicle. However, exemplary embodiments discussed herein include a method of determining the content of an image of a traffic infrastructure indicator to enhance the clear path determination. It should be appreciated that an image of a traffic infrastructure indication can be analyzed by the processing module to determine the content of the traffic infrastructure indication. The content of the traffic infrastructure indication can thereby be augmented with the clear path determination to modify or enhance the clear path determination, wherein the enhanced clear path is utilized in navigation of the vehicle. For example, the clear path determination can be inferred from the content of a traffic signal such as a stop light indicating an approaching intersection. Likewise, a clear path determination indicating an approaching traffic intersection may be used to infer an approaching stop light. In one embodiment, area in an intersection past a stop sign can be held to be not clear until the vehicle completes the stop for the stop sign.

As discussed above, the plurality of images generated by the camera device are monitored and analyzed by the processing module. Based upon the analyzed images from the camera system, a clear path can be determined upon which a potential road surface can be estimated from other portions of the image that do not indicate a potential road surface. For example, referring to FIG. 9, the first scheme utilizes texture-rich image analysis of a field-of-view in front of the vehicle, wherein analyzed pixilated features that describe distinct interest points based upon a contextual view within the image are mapped and utilized to determine a clear path in front of the host vehicle. In another example, referring to FIGS. 16 and 19, the second scheme utilizes texture-less image analysis to filter image non-conforming regions of the image as not belonging to a planar, consistent road surface, wherein a plurality of filtered images are fused together to determine a clear path. It is appreciated that the first scheme and the second scheme can be fused in a number of ways. For instance, an image with identified points and determined heights identified with texture-rich methods can be overlaid with a filtered image generated by texture-less methods, and agreement of the two methods can be used to define a clear path through the overlaid image.

In an exemplary embodiment of the present disclosure, a clear path of travel determined by analyzing images of the camera device can be modified based upon content of an image of a traffic infrastructure indication. As discussed above, the camera system can be utilized as an input to the processing module for determining the content of a traffic infrastructure indication and modifying a clear path determination based upon the content of the traffic infrastructure indication. The camera system includes a camera or image capturing device taking periodic or sequential images representing a view from the vehicle. Methods for analyzing visual information are known in the art to include pattern recognition, corner detection, vertical edge detection, vertical object recognition, and other methods. Additionally, image recognition frequently includes programming to look for changes in contrast or color in an image indicating vertical lines, edges, corners or other patterns indicative of traffic infrastructure indications. Such image recognition methods can include methods to discern textual messages from the signs. In addition, particular sign types, logos, or trademarks can be stored in a database for comparison and cross referenced for context or significance. However, it will be appreciated that high-resolution visual representations of the field in front of a vehicle refreshing at a high rate necessary to appreciate motion in real-time include a very large amount of information to be analyzed. Real-time analysis of visual information can be prohibitive. Methods of fusing input from a camera system created by methods such as track fusion are known in the art and will not be discussed in detail herein. Utilizing fusing input helps to discern moving objects such as vehicles from stationary traffic infrastructure indications such as roadside sign.

Camera data can be utilized to detect traffic infrastructure indicators such as roadside signs and traffic lights. It will be appreciated that other devices can be utilized to detect traffic infrastructure indicators. For example, LIDAR can be utilized to recognize the presence of signs and some context from the signs, for example, discerning the shape of a stop sign. Vehicle to infrastructure (V2I) communications can be utilized to communicate a content of a street sign or a traffic light to passing vehicles, and other onboard devices such as a radar system can be utilized to localize the traffic commands, for example to an intersection or a sign post location. Vehicle to vehicle (V2V) communications can be utilized to communicate data between vehicles, for example, with one vehicle utilizing a camera system communicating information about an intersection to following vehicles approaching the intersection. In another example, vehicles stopped at a stop sign at an intersection can utilize V2V communications to negotiate an order for the vehicles to proceed through their stop signs, with the clear path of each vehicle reflecting the negotiation. In one embodiment, an intersection can be determined to be not a clear path until the negotiation is made for the vehicle to proceed. Similarly, a red light can be utilized to classify the intersection as not clear until the light turns green. A number of devices and additional embodiments utilizing the devices to detect traffic infrastructure indications are envisioned, and the disclosure is not intended to be limited to the exemplary embodiments described herein.

Traffic infrastructure indications include numerous possibilities. Traffic infrastructure indications can include, inter alia, roadside signs and traffic signals. Roadside signs can include speed limit indications or road classification indicators, such as interstate highway indicators. Such indicators can be utilized with a clear path analysis to forecast a type of road being traveled upon. For example, a roadway with a high speed limit or with a highway designation is unlikely to include a sharp turn in excess of certain guidelines. Roadside signs further include approaching road geometries relating to traffic lanes such as mandatory lane curvatures, turn only lanes, one way, keep right, keep left, and exit/enter roadside signs. Roadside signs can further include warnings of approaching road geometries such as added left/right lane, left/right lane ending, no outlet, side road left/right, railroad crossings, reverse curves, reverse turn left/right, lane ending and approaching intersections. Clear path analysis can include enhanced traffic infrastructure indication detection, focusing computational resources based upon forecasted road geometry. For example, a patch-based grid pattern can be selected to include patches particularly arrayed to a left side of a field-of-view if an upcoming left turn in the road is forecasted. A texture-rich analysis, in a similar situation, detecting lane markings and accompanying indicators following the left turn, can include dedicated analysis leading the lane markers around the turn. By focusing computational resources based upon a predetermined road geometry, the overall detection can be made more efficient. Additionally, it will be appreciated that clear path detection involves developing different hypotheses of the structure of the detected roadway and selecting between these different hypotheses to determine the clear path. Additional information including information that is available from traffic infrastructure devices can give more or less weight to different hypotheses. It should be appreciated that a 3-D mapping device and a GPS device can additionally or alternatively be utilized to determine the content of the roadside signs detected by the camera system, where the content of the roadside signs is stored in the 3-D mapping device and/or the GPS device. For example, an approaching roundabout could be used to guide clear path analysis towards the right based on a priori known structure of a roundabout. Additionally, content of roadside signs relating to road construction geometries can also be utilized to modify the determined clear path. For example, a speed limit may be reduced in a construction zone due to the presence of road workers. Although a clear path can be determined by the camera system utilizing one of the schemes above, the content of a roadside sign indicating a reduced speed in the construction zone can be augmented for mutual benefit refinement with the determined clear path and utilized to assist in navigation of the vehicle. In another example, construction zone signs frequently alert to shifting lanes, lane ending, instructions to maintain a current lane, and other similar indications. Such indications can be utilized to enhance clear path detection with the sign instructions. Similarly, the detected clear path can be utilized to augment comprehension of the indicator instructions, for example, with the boundaries of the detected clear path being likely to include construction zone indicators.

Figure 20:
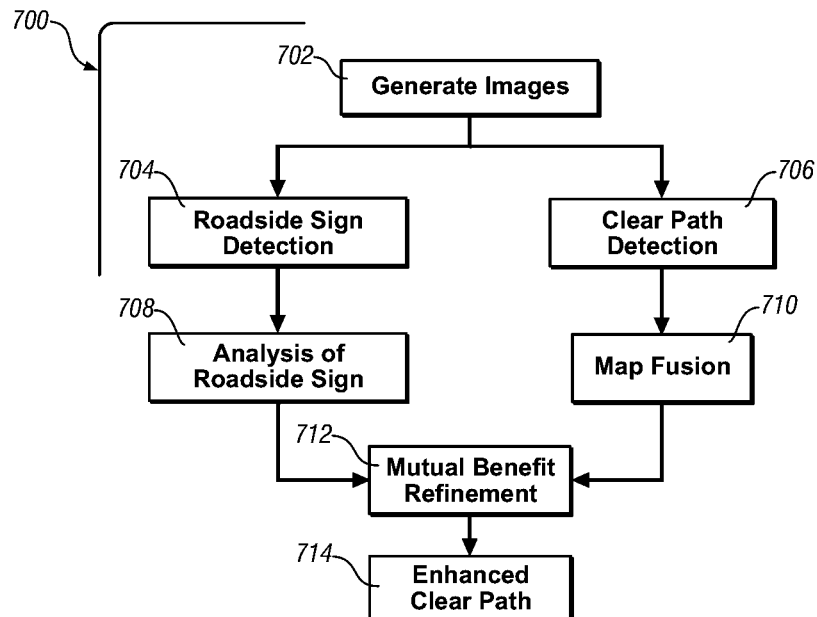
FIG. 20 depicts an exemplary flow chart for detecting an enhanced clear path, in accordance with the present disclosure.

Referring to FIG. 20, an exemplary embodiment illustrating a process scheme 700 for determining an enhanced clear path based upon mutual benefit refinement between roadside sign analysis and map fusion of a detected clear path. Exemplary process 700 begins at step 702, wherein images are generated. It will be appreciated at step 706, that a clear path can be detected by the first processing scheme, employing texture-rich methods, or the second processing scheme, employing texture-less methods, wherein each scheme enables identification of road features useful to describe a clear path in the view of the vehicle. Clear path analysis by the fusion of texture-rich and textureless methods is given as an exemplary analysis, but it will be appreciated that any of the above described analyses can be used. At step 710, the first scheme and the second scheme can be fused in a number of ways. These methods are discussed above, and will not be discussed in detail herein. At step 704, a roadside sign can be detected and analyzed at step 708. As discussed above, a detected roadside sign can be analyzed to determine the content of the roadside sign. The content of the roadside sign can be determined utilizing pattern recognition, corner detection, vertical edge detection, vertical object recognition, image recognition and/or image recognition methods including methods to discern textual messages from the signs. For instance, image recognition could be utilized to discern a stop sign. Additionally, the roadside sign can be analyzed to determine the content by storing the image of the roadside sign in a database for comparison and cross referenced for context or significance. At step 712, the content of the analyzed roadside sign can be augmented or fused with the detected and fused clear path for mutual benefit refinement. Mutual benefit refinement provides for confidence to the detected clear path, and additionally, can be utilized to infer the possibility of roadside sign locations along the roadway. At step 714, an enhanced clear path is determined based upon the mutual benefit refinement determined at step 712.

Figure 21:
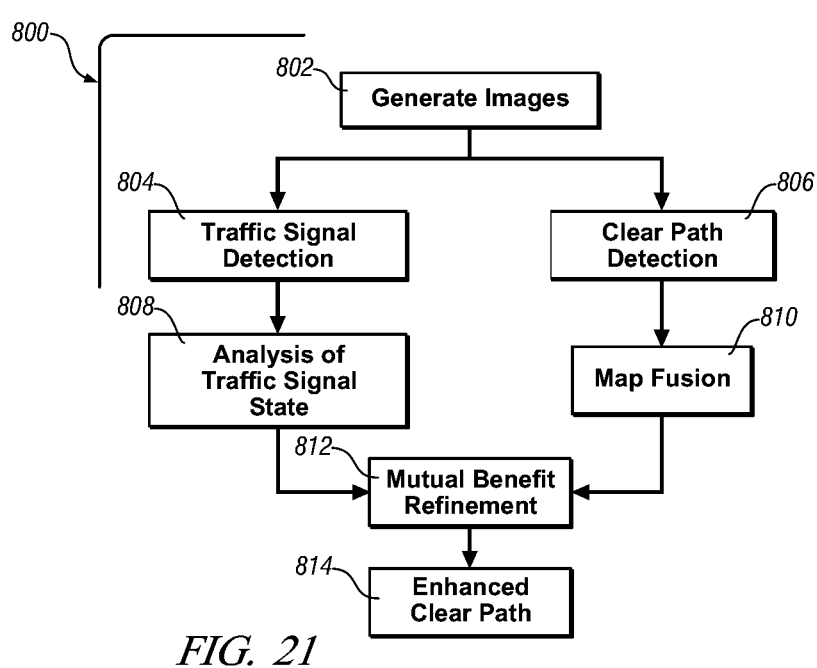
FIG. 21 depicts an exemplary flow chart for detecting an enhanced clear path, in accordance with the present disclosure.

Traffic infrastructure indications can also include traffic signal indications. Traffic signal indications can include, but are not limited to, traffic lights, railroad crossing lights, stop lights and cautionary intersection lights. Referring to FIG. 21, an exemplary embodiment illustrating a process scheme 800 for determining an enhanced clear path based upon mutual benefit refinement between traffic signal state analysis and map fusion of a detected clear path. Exemplary process 800 begins at step 802, wherein images are generated. It will be appreciated at step 806, that a clear path can be detected by fusion of an exemplary patch-based method and an exemplary pixel-based method. At step 810, the two detection methods can be fused in a number of ways. These methods are discussed above, and will not be discussed in detail herein. At step 804, a traffic signal, for instance a traffic light, can be detected and analyzed at step 808. At step 814, the traffic signal can be detected utilizing pattern recognition, corner detection, vertical edge detection, vertical object recognition, image recognition, image recognition and/or storing the image of the traffic signal in a database for comparison and cross referenced for context or significance. As discussed above, a detected traffic signal can be analyzed to determine the content of the traffic signal. For instance, analysis of a traffic light can discern a proceed signal, stop signal or caution signal by utilizing color contrast methods or measuring light intensity to determine a green, red or amber color signal. At step 812, the content of the analyzed traffic signal can be augmented or fused with the detected and fused clear path for mutual benefit refinement. Mutual benefit refinement provides for confidence to the detected clear path, and additionally, can be utilized to infer the possibility of traffic signal locations on the roadway. For example, although a clear path may be determined, a red traffic signal indication can be augmented with the detected clear path to inform the vehicle that traffic may be intersecting the clear path. At step 814, an enhanced clear path is determined based upon the mutual benefit refinement determined at step 812.

By monitoring the images from the camera system and applying analysis to the monitored images in order to identify an image of a traffic infrastructure indication, and further analyzing the image of the traffic infrastructure indication to determine the content of the traffic infrastructure indication, the determined clear path can be modified based upon the content of the traffic infrastructure indication and utilized in navigation of the vehicle. The analyzed image of the traffic infrastructure indication can describe a threshold condition.

The threshold condition may be preset, learned, and/or selectable based upon numerous informational inputs. Threshold conditions are set to minimize non-critical or non-desirable distractions upon the vehicle, wherein the image of a traffic infrastructure indication describing a threshold condition is processed and augmented with a clear path determination to determine an enhanced clear path, wherein the enhanced clear path is utilized in navigation of the vehicle. It is understood that the vehicle is capable of operating in an autonomous or semi-autonomous driving mode. The vehicle includes an autonomous steering device and a speed control device that are operative based upon whether a clear path has been determined or not, and additionally taking into consideration the content of traffic infrastructure indications describing threshold conditions provides increased confidence in the clear path captured by the camera device and analyzed by the processing module.

Clear path detection can be utilized to enhance detection and understanding the context of roadside signs. For example, the current speed of a vehicle may be monitored while the camera system captures an image of a roadside sign indicating the speed limit. The speed limit sign captured by the camera system may be analyzed by pattern recognition to discern a speed limit indication. The discerned speed limit is thereby compared to the monitored speed of the vehicle to indicate a threshold condition based upon the comparing. However, the detection of the speed limit can be in error. Analysis of the clear path of travel, for example, describing an approaching sharp turn in the road or a pattern describing a special zone such as a parking lot or a school zone, the monitored speed limit can be checked against the information discernable by the clear path analysis and invalidated as appropriate.

In another example, the camera system can capture an image of a traffic signal indicator while the current speed of the vehicle and the distance of the vehicle to the traffic signal are monitored. The monitored image of the traffic signal indicator can be stored in a database for comparison and cross referenced for context to indicate a traffic light. The speed of the vehicle and the distance of the vehicle from the traffic light can be compared and a threshold condition can be indicated based upon the comparing. For instance, a threshold condition can be determined, based upon the speed of the vehicle and the distance the vehicle is from the traffic light, describing that the vehicle is not planning to stop at the traffic light. The threshold condition can be augmented with the clear path determination to generate a mutual benefit refinement based upon the augmentation between the determined threshold and the determined clear path.

In another example, the camera system can be utilized to capture an image of a roadside sign while informational inputs can be monitored to describe a lane in which the vehicle is currently traveling. A lane ending roadside sign, informational billboard or configurable traffic message sign, or electronically transmitted vehicle to infrastructure communication can be analyzed to indicate a threshold condition based on monitoring informational inputs relating to the lane in which the vehicle is traveling and vacancies in neighboring lanes to merge into. For example, utilizing visual informational inputs from the camera system, comprehension of which lane the vehicle is currently traveling is determined and a threshold condition can be indicated when an analyzed image of a roadside sign indicates that the lane the vehicle is currently travelling is ending and a merge into a neighboring lane is required. The threshold condition can be augmented with the clear path determination to generate a mutual benefit refinement based upon the augmentation between the determined threshold and the determined clear path.

In another exemplary embodiment, threshold conditions based upon monitored informational inputs indicating augmented road signs in risk of being violated can be implemented. A stop sign captured by the camera system can be analyzed using image recognition indicating colors and shapes indicative of stop signs. Informational inputs relating to the current speed of the vehicle and stopping distance to the stop sign can be monitored. It is appreciated that the stopping distance to the stop sign can be determined utilizing GPS information, 3D map information and/or radar returns. A threshold condition can be indicated if it is determined that the vehicle is in risk of violating the stop sign based on the monitored informational inputs relating to the current speed of the vehicle and the stopping distance to the stop sign. The threshold condition can be augmented with the clear path determination to generate a mutual benefit refinement based upon the augmentation between the determined threshold and the determined clear path.

Figure 22:
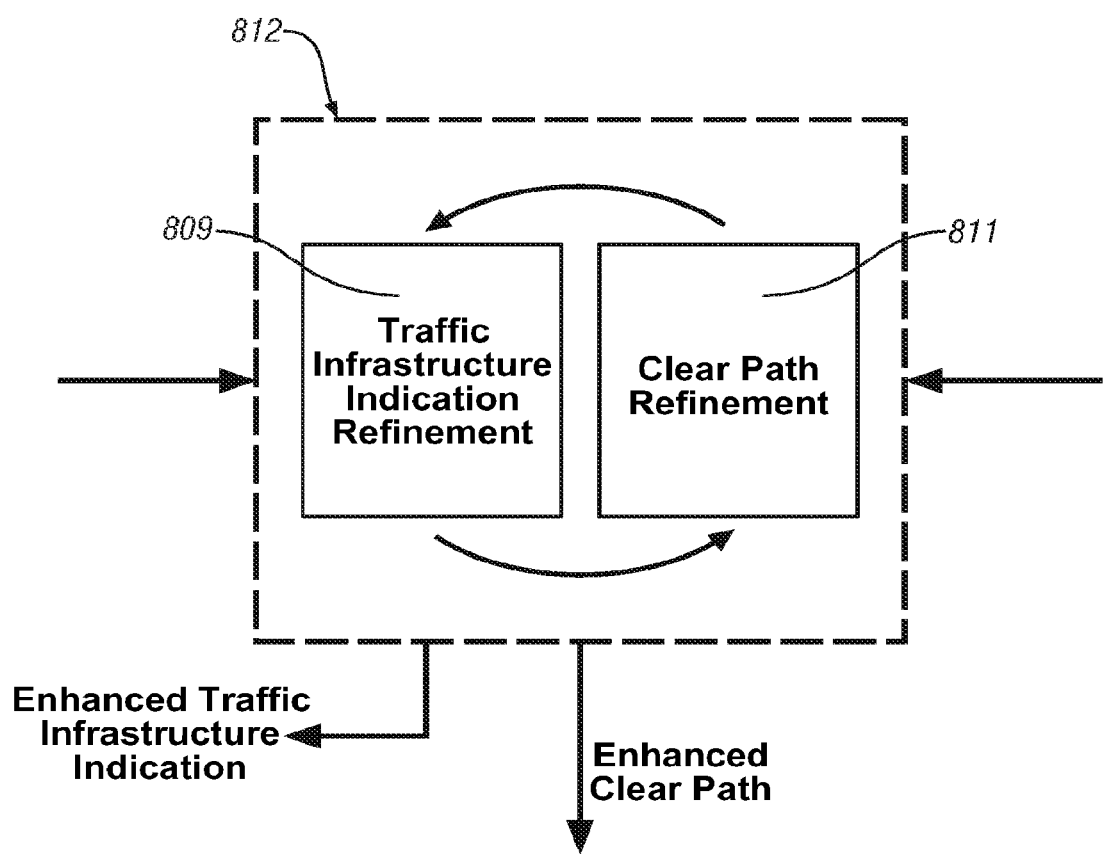
FIG. 22 graphically depicts such an iterative analysis, in accordance with the present disclosure.

Step 812 of FIG. 21 and step 712 of FIG. 20 illustrate mutual benefits refinement, inputting a clear path and traffic infrastructure indication information, to output an enhanced clear path. As will be appreciated from the above described methods, clear path can benefit from detection of traffic infrastructure indications, augmenting an understanding of what areas are likely to be a clear path. It will be appreciated that enhanced traffic infrastructure indication comprehension can similarly be accomplished by analysis of the identified clear path. For example, in a construction area, clear path indications showing shifting lanes of traffic or vehicles undergoing unexpected changes in motion can be utilized to augment detection and analysis of the construction area. Computational resources can be devoted to the analysis of the area based upon the clear path information. Such an analysis can be iteratively reinforced with subsequent images, building confidence along the route of travel of both the clear path and the traffic infrastructure indication. Additionally, a single image can be iteratively examined, with multiple iterations of clear path analysis and traffic infrastructure indication analysis reinforcing overall analysis of the single image. Such an analysis loop can beneficially refine starting assumptions and results of the analyses. FIG. 22 graphically depicts such an iterative analysis, in accordance with the present disclosure. Step 812 is depicted, including traffic infrastructure indication refinement in step 809 and clear path refinement in step 811. Step 812 outputs both the enhanced clear path, as described above, and additionally exemplary enhanced object tracking information.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for detecting a clear path of travel for a vehicle utilizing analysis of a plurality of images generated by a camera device located upon the vehicle, the images generated by the camera device are input to a processing module configured to execute the method comprising:
monitoring the images;
analyzing the images comprising
determining a clear path upon which a potential road surface can be estimated from other portion of the images that do not indicate a potential road surface;
determining an image of a traffic infrastructure indication;
determining the content of the traffic infrastructure indication;
iteratively fusing the content of the traffic infrastructure indication and the determined clear path to generate a modified clear path, comprising
determining, during a first iteration, that the determined clear path describes a section along the potential road surface of a special zone that invalidates the content of the traffic infrastructure indication and enhancing the content of the traffic infrastructure indication to correspond with the section along the potential road surface or the special zone described by the determined clear path,
determining, during a second iteration, that the enhanced content of the traffic infrastructure indication describes a threshold condition, the threshold condition selected to minimize at least one of non-critical and non-desirable distractions upon the vehicle operating in one of autonomous and semi-autonomous driving modes, and modifying the clear path based upon the enhanced content of the traffic infrastructure indication; and
utilizing the modified clear path in navigation of the vehicle.

2. The method of claim 1, wherein determining the image of the traffic infrastructure indication comprises determining a roadside sign.

3. The method of claim 2, wherein the roadside sign comprises a stop sign.

4. The method of claim 3, further comprising: determining, during the first iteration, that the determined clear path does not describe the section along the potential road surface or the special zone that invalidates the content of the traffic infrastructure indications and modifying the clear path based upon the stop sign comprising indicating road past the stop sign to be not clear path until the vehicle stops at the stop sign.

5. The method of claim 2, wherein the roadside sign comprises a road geometry sign.

6. The method of claim 2, wherein the roadside sign comprises a road construction indication.

7. The method of claim 1, wherein determining the image of the traffic infrastructure indication comprises determining a traffic signal indication.

8. The method of claim 7, further comprising: determining, during the first iteration, that the determined clear path does not describe the section along the potential road surface or the special zone that invalidates the content of the traffic infrastructure indications and modifying the clear path based upon the traffic signal indication comprising indicating road past the traffic signal indication indicates a stop condition.

9. The method of claim 1, wherein determining the content of the traffic infrastructure indication comprises storing the image of the traffic infrastructure indicator in a database for comparison and cross referencing for context.

10. The method of claim 1, wherein determining the content of the traffic infrastructure indication comprises utilizing pattern recognition to determine the content of the traffic infrastructure indication.

11. The method of claim 1, wherein determining the content of the traffic infrastructure indication comprises monitoring a vehicle-to-infrastructure communication link.

12. The method of claim 1, further comprising monitoring a GPS digital map device; and
wherein determining the image of the traffic infrastructure indication comprises determining a traffic direction signal based upon data from the GPS digital map device.

13. A system for detecting a clear path of travel for a vehicle utilizing analysis of a plurality of images generated by a camera device located upon the vehicle, the system comprising:
a camera device located upon the vehicle and configured to generate a plurality of images;
a control module configured to monitor the images and analyze the images from the camera device, wherein analyzing the images from the camera device comprises
determining a clear path upon which a potential road surface can be estimated from other portions of the image that do not indicate a potential road surface;
determining an image of a traffic infrastructure indication;
determining the content of the traffic infrastructure indication;
iteratively fusing the content of the traffic infrastructure indication and the determined clear path to generate a modified clear path, comprising
determining, during a first iteration, that the determined clear path describes a section along the potential road surface of a special zone that invalidates the content of the traffic infrastructure indication and enhancing the content of the traffic infrastructure indication to correspond with the section along the potential road surface or the special zone described by the determined clear path,
determining, during a second iteration, that the enhanced content of the traffic infrastructure indication describes a threshold condition, the threshold condition selected to minimize at least one of non-critical and non-desirable distractions upon the vehicle operating in one of autonomous and semi-autonomous driving modes, and modifying the clear path based upon the enhanced content of the traffic infrastructure indication; and
utilizing the modified clear path in navigation of the vehicle.

14. The system of claim 13, further comprising an autonomous steering system operating based upon the analyzing the images from the camera device.

* * * * *